US008814151B2

(12) United States Patent
Matsuda

(10) Patent No.: US 8,814,151 B2
(45) Date of Patent: Aug. 26, 2014

(54) ANTIVIBRATION DEVICE

(75) Inventor: Naohisa Matsuda, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 98 days.

(21) Appl. No.: 13/521,521

(22) PCT Filed: Jan. 12, 2011

(86) PCT No.: PCT/JP2011/050352
§ 371 (c)(1),
(2), (4) Date: Jul. 11, 2012

(87) PCT Pub. No.: WO2011/087019
PCT Pub. Date: Jul. 21, 2011

(65) Prior Publication Data
US 2012/0299228 A1  Nov. 29, 2012

(30) Foreign Application Priority Data

Jan. 12, 2010 (JP) ................................. 2010-004163
Jan. 12, 2010 (JP) ................................. 2010-004164

(51) Int. Cl.
*F16F 5/00* (2006.01)
*F16F 9/00* (2006.01)
*F16F 9/10* (2006.01)

(52) U.S. Cl.
USPC ...................................... 267/140.13; 267/292

(58) Field of Classification Search
USPC .................... 267/140.13, 140.14, 140.15, 292
See application file for complete search history.

(56) References Cited

U.S. PATENT DOCUMENTS

| 4,437,653 A | | 3/1984 | Kakimoto | |
|---|---|---|---|---|
| 4,721,288 A | * | 1/1988 | Andra et al. | ............. 267/140.13 |
| 5,209,462 A | * | 5/1993 | Le Fol et al. | ............. 267/140.14 |
| 6,612,554 B1 | * | 9/2003 | Linn | ........................ 267/140.13 |

(Continued)

FOREIGN PATENT DOCUMENTS

| CN | 1538088 A | 10/2004 |
|---|---|---|
| CN | 1667292 A | 9/2005 |

(Continued)

OTHER PUBLICATIONS

International Search Report of PCT/JP2011/050352 dated Apr. 19, 2011.

(Continued)

*Primary Examiner* — Thomas J Williams
(74) *Attorney, Agent, or Firm* — Sughrue Mion, PLLC

(57) ABSTRACT

In an antivibration device (1), a partition plate (45) includes a main partition plate (46) made of an elastic material interposed between a protruding portion (60) and a support portion (54), and a reinforcement member (47) which is buried in the main partition plate (46) and is configured of a hard body that is harder than the main partition plate (46). The main partition plate (46) divides a main liquid chamber (9A) and a sub-liquid chamber (9B), and blocks the opening end of the hard member (50). A space surrounded by the hard member (50) and the main partition plate (46) constitutes a restriction passage (10). In the main partition plate (46), a communication portion (42) that penetrates therethrough in an axial direction and causes the main liquid chamber (9A) and the restriction passage (10) to communicate is formed. The reinforcement member (47) is disposed to surround the peripheral edge of the communication portion (42) in the main partition plate (46).

4 Claims, 23 Drawing Sheets

(56) References Cited

U.S. PATENT DOCUMENTS

| | | | | |
|---|---|---|---|---|
| 7,025,340 | B2 * | 4/2006 | Inoue | 267/140.13 |
| 7,396,003 | B2 * | 7/2008 | Hibi et al. | 267/140.13 |
| 2009/0243171 | A1 * | 10/2009 | Nanno et al. | 267/140.13 |

FOREIGN PATENT DOCUMENTS

| | | |
|---|---|---|
| EP | 0 828 089 A2 | 3/1998 |
| JP | 57-138423 A | 8/1982 |
| JP | 08-261273 A | 10/1996 |
| JP | 2001-165231 A | 6/2001 |
| JP | 2004-003634 A | 1/2004 |
| JP | 2005-083461 A | 3/2005 |
| JP | 2005-282662 A | 10/2005 |
| JP | 2006-090388 A | 4/2006 |
| JP | 2006-283779 A | 10/2006 |
| JP | 2008-185152 A | 8/2008 |
| JP | 2009-138847 A | 6/2009 |
| JP | 2009-236282 A | 10/2009 |
| JP | 2009-250332 A | 10/2009 |

OTHER PUBLICATIONS

Chinese Office Action and Search Report issued in Chinese Application No. 201180013197.7 dated Jan. 17, 2014.

* cited by examiner

ANTIVIBRATION DEVICE

CROSS REFERENCE TO RELATED APPLICATIONS

This application is a National Stage of International Application No. PCT/JP2011/050352 filed Jan. 12, 2011, claiming priority based on Japanese Patent Application Nos. 2010-004163 filed Jan. 12, 2010 and JP 2010-004164 filed Jan. 12, 2010, the contents of all of which are incorporated herein by reference in their entirety.

TECHNICAL FIELD

The present invention relates to an antivibration device used when a vibration-generating section such as, for example, an engine of a vehicle is mounted to a vibration-receiving section such as a vehicle body.

Priority is claimed on Japanese Patent Application No. 2010-004163, filed on Jan. 12, 2010, and Japanese Patent Application No. 2010-004164, filed on Jan. 12, 2010, the contents of which are incorporated herein by reference.

BACKGROUND ART

An engine mount (antivibration device) according to the related art includes, for example, as described in Patent Document 1: a cylindrical outer cylinder (first mounting member) connected to a vibration-receiving section such as a vehicle body; an inner cylinder (second mounting member) connected to a vibration-generating section such as an engine; an elastic body which elastically connects the outer cylinder to the inner cylinder and blocks the opening end of one side of the outer cylinder; a diaphragm which blocks the opening end of the other side of the outer cylinder; and a partition plate which divides a liquid chamber that is formed between the elastic body and the diaphragm and has a liquid sealed therein, into a main liquid chamber that uses the elastic body as a portion of the wall surface thereof and a sub-liquid chamber that uses the diaphragm as a portion of the wall surface thereof. The partition plate and the diaphragm mentioned above are members which are made entirely of rubber. The partition plate is fitted to the inner side of the above-mentioned outer cylinder from the opening end of the lower side thereof, and the diaphragm is fitted to the inner side of the outer cylinder, at the rear of the partition plate. Thereafter, the outer cylinder is covered with a cup-shaped holder from the lower side, and the diaphragm is pressed from the lower side by the holder. As a result of the holder pressing the diaphragm from the lower side, the partition plate and the diaphragm are interposed between the elastic body and the holder in stacked state such that the above-mentioned engine mount is assembled. In the above-mentioned engine mount, since the partition plate is entirely formed of rubber, the generation of noise due to cavitation may be suppressed.

DOCUMENTS OF RELATED ART

Patent Document

[Patent Document 1] Japanese Patent Application, First Publication No. 2001-165231

SUMMARY OF INVENTION

Technical Problem

However, in the above-mentioned engine mount according to the related art, since the partition plate is entirely formed of rubber, in a case where the partition plate is assembled with the outer cylinder during manufacturing, when the outside diameter of the partition plate is set to be greater than the inside diameter of the outer cylinder to provide an interference and the partition plate is press-fitted to the inner side of the outer cylinder, there is a possibility that an excessive press-fitting load may be exerted on the partition plate and the partition plate may be assembled with the outer cylinder in a state of being subjected to flexural deformation.

On the other hand, in a case where the outside diameter of the partition plate is set to be smaller than the inside diameter of the outer cylinder to provide a gap and the partition plate is inserted into the outer cylinder, the partition plate has a tendency to come away from the outer cylinder during transport of the components and the like and the transport of the components is difficult. Particularly, when the engine mount is assembled in a liquid, there may be cases where an intermediate body where the partition plate is inserted into the outer cylinder is moved in the liquid. In this case, the partition plate may come away from the outer cylinder.

In addition, when the holder is assembled with the outer cylinder, the diaphragm is pressed to the upper side by the holder and moreover the partition plate is pressed to the upper side by the diaphragm. Therefore, when the pressing force is weakened, sealability is degraded, and sealing performance of the liquid chamber is degraded. Accordingly, the above-described pressing force needs to be increased so as to ensure sealability. However, with a strong pressing operation, the partition plate which is entirely formed of rubber undergoes compressive deformation. Consequently, the shape of the partition plate which is entirely formed of rubber is changed due to the pressing status and the characteristics thereof become unstable. In addition, as the partition plate undergoes compressive deformation, the height dimensions of the engine mount vary.

Here, the inventors developed an engine mount having a configuration, for example, as shown in FIG. 30, in order to solve the problem described above.

As shown in FIG. 30, the engine mount 600 includes: an outer cylinder 606; an inner cylinder 607 disposed on the upper side of the outer cylinder 606; an elastic body 608 that elastically connects the outer cylinder 606 to the inner cylinder 607; a diaphragm 605 provided at the lower end of the outer cylinder 606; and a partition plate 611 that divides a liquid chamber 609 formed between the elastic body 608 and the diaphragm 605 into a main liquid chamber 609A and a sub-liquid chamber 609B. In addition, the diaphragm 605 includes a diaphragm ring 650 which is fitted to the inner side in the radial direction of the outer cylinder 606 and has a concave shape in a cross-sectional view, and a space formed between the diaphragm ring 650 and the partition plate 611 constitutes an orifice passage 610 that causes the main liquid chamber 609A and the sub-liquid chamber 609B to communicate.

In addition, a dent portion 660 and a caulking portion 664 are formed in the outer cylinder 606, and thus an outer peripheral wall portion 653 of the diaphragm 605 (the diaphragm ring 650) may be interposed between the dent portion 660 and the caulking portion 664 from both sides thereof in the axial direction.

However, the engine mount 600 having the above-described configuration still has the following problems.

As shown in FIG. 31, in the above-described engine mount 600, due to the configuration in which the partition plate 611 is interposed between the dent portion 660 and the caulking portion 664, in a case where the inner cylinder 607 significantly moves relatively upward with respect to the outer cylinder 606 and thus vibration in the rebound direction is input to the engine mount 600, it is difficult to respond to a rapid change in the liquid pressure. In this case, there is a possibility that the partition plate 611 may rise from the diaphragm ring 650. Particularly, the peripheral edge of a main liquid chamber side orifice opening 642 that causes the orifice passage 610 and the main liquid chamber 609A to communicate is not interposed between the dent portion 660 and the caulking portion 664, and thus there is a possibility that a gap S may be formed at the abutting part of the partition plate 611 and the diaphragm ring 650 (curling occurs). Accordingly, there is a possibility that the sealability between the orifice passage 610 formed between the partition plate 611 and the diaphragm ring 650 and the sub-liquid chamber 609B may not be maintained, and both the liquid chambers 609A and 609B may communicate without passing through the orifice passage 610. That is, the liquid flowing through the orifice passage 610 directly leaks to the sub-liquid chamber 609B from the communication part (see arrow T in FIG. 31), resulting in degradation in the vibration absorption performance of the engine mount 600.

The present invention has been made in view of the foregoing circumstances, and an object thereof is to provide an antivibration device capable of enhancing the assembly characteristics of a partition plate, ensuring sealability between a partition member and each liquid chamber, and obtaining stable vibration absorption performance.

Solution to Problem

According to a first aspect of the present invention, an antivibration device includes: a cylindrical first mounting member connected to one of a vibration-generating section and a vibration-receiving section; a second mounting member connected to the other of the vibration-generating section and the vibration-receiving section; an elastic body which elastically connects the first mounting member to the second mounting member and blocks an opening end of one side of the first mounting member; a diaphragm which blocks an opening end of the other side of the first mounting member; and a partition member, which divides a liquid chamber that is formed between the elastic body and the diaphragm and has a liquid sealed therein, into a main liquid chamber that uses the elastic body as a portion of a wall surface thereof and a sub-liquid chamber that uses the diaphragm as a portion of a wall surface thereof, and in which a restriction passage that causes the main liquid chamber and the sub-liquid chamber to communicate is formed. The first mounting member includes a protruding portion that protrudes inward in a radial direction, and a first cylindrical portion disposed further to the sub-liquid chamber side than the protruding portion. The partition member includes a partition plate and an annular hard member made of a hard body that is harder than the elastic body. The hard member includes an annular bottom wall portion disposed coaxially with the first cylindrical portion, a second cylindrical portion having an outer peripheral wall shape connected to an outer edge portion of the bottom wall portion, and a support portion having an inner peripheral wall shape connected to an inner edge portion of the bottom wall portion. One of the first and second cylindrical portions is disposed inside the other of the first and second cylindrical portions. One of the first mounting member and the hard member, which includes a cylindrical portion of the first and second cylindrical portions that is disposed on an outer side thereof, is provided with a locking portion that locks one end portion of a cylindrical portion of the first and second cylindrical portions that is disposed on an inner side thereof, and a caulking portion that is bent inward in the radial direction and locks the other end portion of the cylindrical portion of the first and second cylindrical portions that is disposed on the inner side thereof. The cylindrical portion of the first and second cylindrical portions that is disposed on the inner side thereof is interposed between the locking portion and the caulking portion. The partition plate includes a main partition plate made of an elastic material interposed between the protruding portion and the support portion, and a reinforcement member that is buried in the main partition plate and is made of a hard body that is harder than the main partition plate. The main partition plate divides the main liquid chamber and the sub-liquid chamber and blocks an opening end of the hard member, and a space surrounded by the hard member and the main partition plate constitutes the restriction passage. In addition, the main partition plate is provided with a communication portion that penetrates therethrough in an axial direction and causes the main liquid chamber and the restriction passage to communicate, and the reinforcement member is disposed to surround a peripheral edge of the communication portion in the main partition plate.

According to the first aspect of the present invention, by clamping the partition plate between the protruding portion and the support portion, the partition plate can be pressed from both sides thereof in the axial direction, and thus the sealability of the partition member can be enhanced even though the pressing force is weaker than that according to the related art. Accordingly, compressive deformation of the partition plate can be suppressed, thereby obtaining stable vibration absorption performance.

Particularly, according to the first aspect of the present invention, as the reinforcement member is disposed inside the main partition plate, a part that is not interposed between the protruding portion and the support portion, that is, the formation region of the communication portion in the main partition plate can be reinforced. Therefore, the rigidity of the peripheral edge of the communication portion in the partition plate is increased, and thus bend of the peripheral edge of the communication portion can be suppressed. As a result, even in a case where high vibration is input to the antivibration device, the partition plate can be prevented from rising from the end surface of the opening end side in the support portion of the hard member, and thus the sealability between the communication portion and the support portion of the hard member can be maintained. Consequently, leakage of the liquid that is present in the restriction passage into the liquid chamber without passing through the restriction passage can be prevented, and thus the vibration absorption performance of the antivibration device can be enhanced.

In addition, since the reinforcement member is buried in the main partition plate, a hard body such as the reinforcement member is not exposed to the main liquid chamber side, and the partition wall of the main liquid chamber is configured of the elastic material (the elastic body or the main partition plate).

Therefore, the impact of the breakup of bubbles during the cavitation phenomenon is reliably absorbed by the main partition plate, and thus the generation of noise due to the cavitation phenomenon can be suppressed and the sealability of the partition member can be maintained.

In addition, in the antivibration device according to the first aspect of the present invention, the main partition plate may be inserted inside the cylindrical portion of the first and second cylindrical portions that is disposed on the inner side thereof, and the reinforcement member may be disposed in an annular shape along a peripheral edge portion of the main partition plate.

In this case, the reinforcement member is also disposed in the peripheral edge portion of the main partition plate other than the formation region of the communication portion, and thus the rigidity of the insertion part of the main partition plate into one of the cylindrical portions can be increased. Accordingly, the assembly characteristics of the main partition plate can be enhanced. That is, deformation and the like of the main partition plate during assembly of the main partition plate and the one cylindrical portion can be prevented. In addition, after the main partition plate and the hard member are assembled, since separation of them from the integrated state is suppressed, the management of components becomes easy. Further, for example, in a case where the components are transported in liquid during sealing of the liquid into the liquid chamber, or the like, the transport of the components in the liquid becomes easy.

According to a second aspect of the present invention, an antivibration device includes: a cylindrical first mounting member connected to one of a vibration-generating section and a vibration-receiving section; a second mounting member connected to the other of the vibration-generating section and the vibration-receiving section; an elastic body which elastically connects the first mounting member to the second mounting member and blocks an opening end of one side of the first mounting member; a diaphragm which blocks an opening end of the other side of the first mounting member; and a partition member, which divides a liquid chamber that is formed between the elastic body and the diaphragm and has a liquid sealed therein, into a main liquid chamber that uses the elastic body as a portion of a wall surface thereof and a sub-liquid chamber that uses the diaphragm as a portion of a wall surface thereof, and in which a restriction passage that causes the main liquid chamber and the sub-liquid chamber to communicate is formed. The first mounting member includes a protruding portion that protrudes inward in a radial direction, and a first cylindrical portion disposed further to the sub-liquid chamber side than the protruding portion. The partition member includes a partition plate that divides the liquid chamber into the main liquid chamber and the sub-liquid chamber, and an annular hard member made of a hard body that is harder than the elastic body. The hard member includes a second cylindrical portion disposed coaxially with the first cylindrical portion, and a support portion that is disposed inside the second cylindrical portion and supports the partition plate. One of the first and second cylindrical portions is disposed inside the other of the first and second cylindrical portions. One of the first mounting member and the hard member, which includes a cylindrical portion of the first and second cylindrical portions that is disposed on an outer side thereof, is provided with a locking portion that locks one end portion of a cylindrical portion of the first and second cylindrical portions that is disposed on an inner side thereof, and a caulking portion that is bent inward in the radial direction and locks the other end portion of the cylindrical portion of the first and second cylindrical portions that is disposed on the inner side thereof. The cylindrical portion of the first and second cylindrical portions that is disposed on the inner side thereof is interposed between the locking portion and the caulking portion. The partition plate includes a main partition plate made of an elastic material interposed between the protruding portion and the support portion, and a reinforcement member that is buried in the main partition plate and is made of a hard body that is harder than the main partition plate. The main partition plate is disposed inside the cylindrical portion of the first and second cylindrical portions that is disposed on the inner side thereof, and the reinforcement member is disposed along a peripheral edge portion of the main partition plate.

According to the second aspect of the present invention, since the reinforcement member is buried in the peripheral edge portion of the main partition plate, the rigidity of the contact part of the partition plate that is in contact with one of the cylindrical portions when being disposed inside the one cylindrical portion can be increased. Accordingly, the assembly characteristics of the main partition plate can be enhanced. That is, deformation and the like of the main partition plate during assembly of the main partition plate and the one cylindrical portion can be prevented, and thus the sealing performance between the partition plate and the one cylindrical portion can be ensured, thereby ensuring the sealability of the liquid chamber. In addition, separation of the partition plate and the one cylindrical portion from the assembled state is suppressed, and thus the management and transport of components become easy.

Moreover, according to the second aspect of the present invention, by clamping the main partition plate between the protruding portion and the support portion, the main partition plate can be pressed from both sides thereof in the axial direction, and thus the sealability of the main partition plate can be enhanced. Accordingly, compressive deformation of the partition plate can be suppressed, thereby obtaining stable vibration absorption performance. In addition, the compression amount of the main partition plate can be restricted by the height of the one cylindrical portion, and thus the height dimensions (dimensions in the axial direction) of the antivibration device can be made uniform.

In addition, the antivibration device according to the second aspect of the present invention may employ the following configurations. The hard member is formed in a U-shape in a cross-sectional view by an annular bottom wall portion, the second cylindrical portion having an outer peripheral wall shape connected to an outer edge portion of the bottom wall portion, and the support portion having an inner peripheral wall shape connected to an inner edge portion of the bottom wall portion. The partition plate blocks an opening end of the hard member having the U-shape in a cross-sectional view. A space surrounded by the partition plate, the bottom wall portion, the second cylindrical portion, and the support portion constitutes the restriction passage that causes the main liquid chamber and the sub-liquid chamber to communicate, and the main partition plate is provided with a communication portion that penetrates therethrough in an axial direction and causes the main liquid chamber and the restriction passage to communicate. In addition, the reinforcement member is arranged in an annular shape inside the cylindrical portion of the first and second cylindrical portions that is disposed on the inner side thereof, and the reinforcement member includes a first reinforcement portion disposed along a peripheral edge portion of the main partition plate and a second reinforcement portion that is formed to bridge both end portions of the first reinforcement portion and is disposed to surround a peripheral edge of the communication portion.

In the antivibration device, since the communication portion that causes the restriction passage and the main liquid chamber to communicate is formed to penetrate through the main partition plate in the axial direction, there may be cases where the peripheral edge of the communication portion is not supported by the protruding portion. In such a case, when high vibration is input to the antivibration device, there is a possibility that the partition plate may rise with respect to the support portion and a gap may be formed at an abutting part of the partition plate and the support portion (curling occurs).

Accordingly, there is a possibility that the sealability between the restriction passage formed between the partition plate and the support portion and the sub-liquid chamber may not be maintained and the liquid between both the liquid chambers may leak without passing through the restriction passage. That is, the liquid flowing through the restriction passage directly leaks to the sub-liquid chamber from the leakage part, resulting in degradation in the vibration absorption performance of the antivibration device.

Here, according to the above-described configuration, as the second reinforcement portion is formed to surround the peripheral edge of the communication portion, a part that is not interposed between the protruding portion and the support portion, that is, the formation region of the communication portion in the main partition plate can be reinforced. Therefore, the rigidity of the peripheral edge of the communication portion in the partition plate is increased, and thus bend of the peripheral edge of the communication portion can be suppressed. As a result, even in a case where high vibration is input to the antivibration device, the partition plate is prevented from rising from the end surface of the opening end side in the support portion, and thus the sealability between the communication portion and the support portion can be maintained. Consequently, leakage of the liquid that is present in the restriction passage into the liquid chamber without passing through the restriction passage can be prevented, and thus the vibration absorption performance of the antivibration device can be enhanced.

In addition, since the reinforcement member is buried in the main partition plate, a hard body such as the reinforcement member is not exposed to the main liquid chamber side, and the inner surface of the main liquid chamber is configured of the elastic material (the elastic body or the main partition plate).

Therefore, the impact of the breakup of bubbles during the cavitation phenomenon is reliably absorbed by the main partition plate, and thus the generation of noise due to the cavitation phenomenon can be suppressed.

In addition, the second cylindrical portion may be disposed inside the first cylindrical portion, the locking portion and the caulking portion may be formed in the first mounting member, and the second cylindrical portion may be interposed between the locking portion and the caulking portion.

In this case, it is easy to enhance the sealability between the first cylindrical portion and the second cylindrical portion. That is, it is possible to enhance the sealability between the first cylindrical portion and the second cylindrical portion by performing a narrowing process on the first cylindrical portion inward in the radial direction.

In addition, a thin film-like diaphragm rubber which is deformable through a change in liquid pressure of the sub-liquid chamber may be disposed inside the hard member in the radial direction, and the hard member may constitute a diaphragm ring of the diaphragm.

In this case, the diaphragm and the hard member are integrated, and thus the number of components is reduced, thereby simplifying the configuration and reducing the number of assembly processes.

In addition, a rubber layer may be provided between the first and second cylindrical portions.

In this case, the rubber layer functions as a buffer material, and thus impact due to contact between the first mounting member and the hard member is suppressed. In addition, transmission of the impact of the breakup of bubbles during the cavitation phenomenon to the first mounting member is suppressed, and moreover, the sealability between the first and second cylindrical portions is enhanced.

Advantageous Effects of Invention

According to the first aspect of the present invention, the rigidity of the peripheral edge of the communication portion in the partition plate is increased, and thus bend of the peripheral edge of the communication portion can be suppressed. As a result, even in a case where high vibration is input to the antivibration device, the partition plate can be prevented from rising from the end surface of the opening end side in the support portion of the hard member, and thus the sealability between the communication portion and the support portion of the hard member can be maintained. Consequently, leakage of the liquid that is present in the restriction passage into the liquid chamber without passing through the restriction passage can be prevented, and thus the vibration absorption performance of the antivibration device can be enhanced.

In addition, according to the second aspect of the present invention, the following effects can be obtained.

1. Since the reinforcement member is buried in the peripheral edge portion of the main partition plate, the rigidity of the contact part of the partition plate that is in contact with the one cylindrical portion when being disposed inside the one cylindrical portion can be increased. Accordingly, the assembly characteristics of the main partition plate can be enhanced. That is, deformation and the like of the main partition plate during assembly of the main partition plate and the one cylindrical portion can be prevented, and thus the sealing performance between the partition plate and the one cylindrical portion can be ensured, thereby ensuring the sealability of the liquid chamber.

2. Separation of the partition plate and the one cylindrical portion from the assembled state is suppressed, and thus the management and transport of components becomes easy.

3. By clamping the main partition plate between the protruding portion and the support portion, the main partition plate can be pressed from both sides thereof in the axial direction, and thus the sealability of the main partition plate can be enhanced. Accordingly, compressive deformation of the partition plate can be suppressed, thereby obtaining stable vibration absorption performance.

4. The compression amount of the main partition plate can be restricted by the height of the one cylindrical portion, and thus the height dimensions (dimensions in the axial direction) of the antivibration device can be made uniform.

DESCRIPTION OF EMBODIMENTS

Next, embodiments of the present invention will be described with reference to the drawings.

First Embodiment

Figure 1:
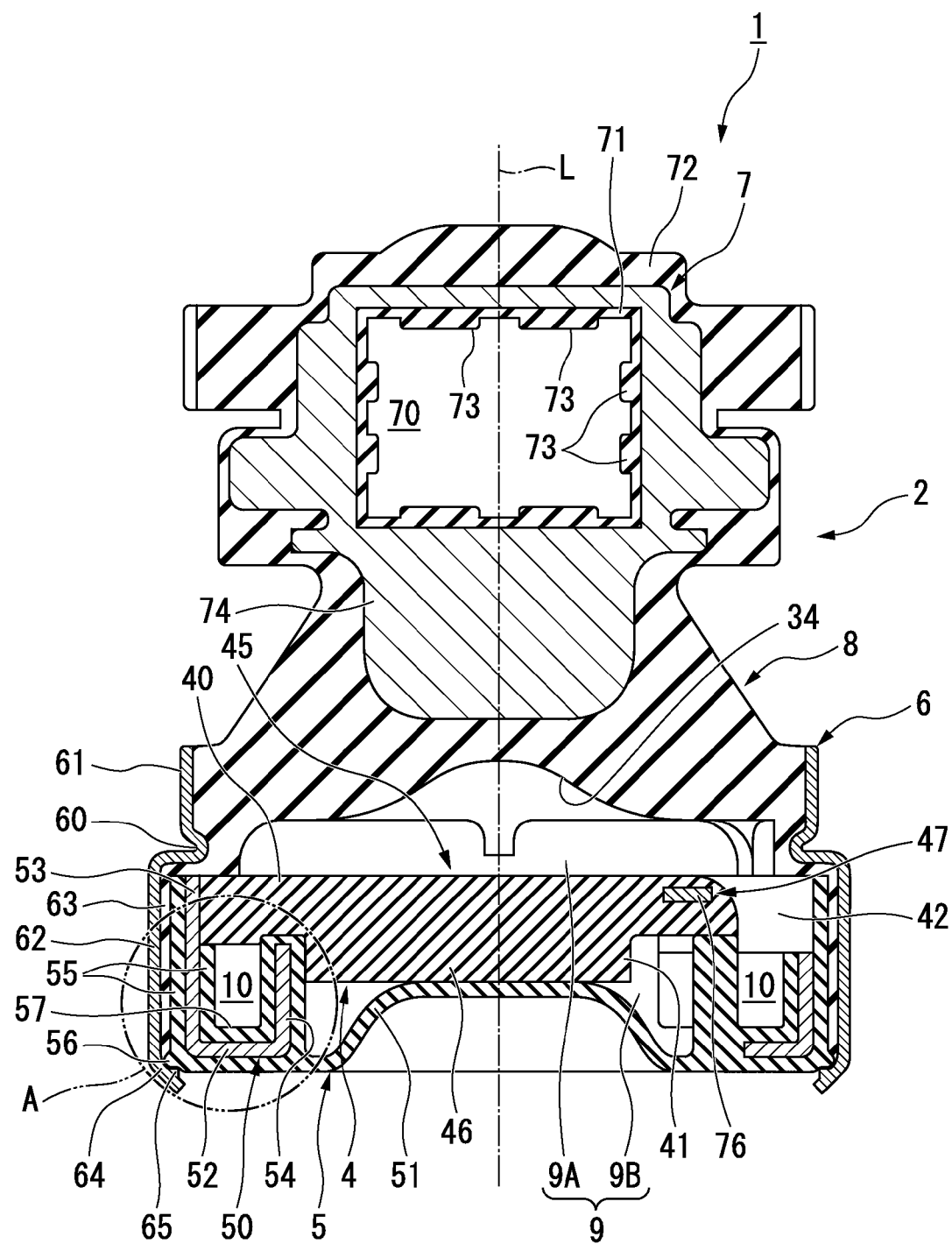
FIG. 1 is a cross-sectional view showing the entire configuration of an engine mount according to a first embodiment of the present invention.

FIG. 1 is a cross-sectional view of an engine mount according to a first embodiment.

In this embodiment, the lower side in FIG. 1 is referred to as a bound side, that is, a direction in which a static load (initial load) is input when the engine mount is installed. The upper side in FIG. 1 is referred to as a rebound side, that is, the side opposite the static load input direction. In addition, reference sign L shown in FIG. 1 denotes the central axis of an outer cylinder 6 described later and is simply described as axis L.

As shown in FIG. 1, an engine mount 1 (antivibration device) is used for mounting an engine which is an example of a vibration-generating section to a vehicle body which is an example of a vibration-receiving section. The engine mount 1 is a device for attenuating the vibration of the vibration-generating section.

The engine mount 1 has a configuration in which a partition member 4 and a diaphragm 5 are attached to a body rubber 2. The engine mount 1 mainly includes: an outer cylinder 6 (first mounting member) connected to the vehicle body (not shown) with a vehicle body bracket (not shown); an inner cylinder 7 (second mounting member) disposed on the upper side in the axis L direction of the outer cylinder 6 and connected to the engine (not shown) with an engine bracket (not shown); an elastic body 8 disposed between the outer cylinder 6 and the inner cylinder 7 and made of a rubber elastic body; the diaphragm 5 provided at the lower end in the axis L direction of the outer cylinder 6; and the partition member 4 which divides a liquid chamber 9 formed between the elastic body 8 and the diaphragm 5 into a main liquid chamber 9A and a sub-liquid chamber 9B and is provided with an orifice passage 10 (restriction passage) that causes the main liquid chamber 9A and the sub-liquid chamber 9B to communicate. In addition, the body rubber 2 described above is constituted by the outer cylinder 6, the inner cylinder 7, and the elastic body 8.

The outer cylinder 6 is a substantially cylindrical metal fitting of which both ends in the axis L direction are open. The outer cylinder 6 includes: an annular dent portion 60 (protruding portion, locking portion) disposed at the intermediate part thereof in the axis L direction; an upper cylindrical portion 61 formed further to the upper side in the axis L direction than the dent portion 60 in a cylindrical shape; and a lower cylindrical portion 62 (first cylindrical portion) formed further to the lower side than the dent portion 60 in a cylindrical shape.

The dent portion 60 is formed to protrude further toward the inner side in the radial direction than the upper and lower cylindrical portions 61 and 62. The dent portion 60 locks the upper end portion in the axis L direction of an outer peripheral wall portion 53 (second cylindrical portion) of a diaphragm ring 50 (hard member) described later. The dent portion 60 is formed by flexural deformation toward the inner side in the radial direction so as to narrow the outer cylinder 6 in the cylindrical shape, and is formed over the entire periphery of the outer cylinder 6 between the upper and lower cylindrical portions 61 and 62. The lower cylindrical portion 62 is a cylinder portion having a larger diameter than that of the upper cylindrical portion 61, and the diaphragm 5 (the diaphragm ring 50) is fitted therein.

Figure 2:
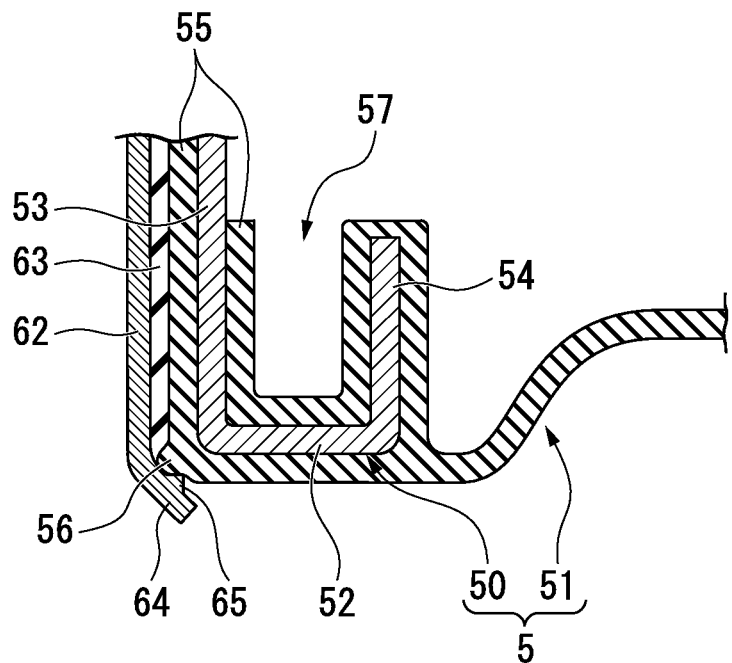
FIG. 2 is an enlarged view of portion A of FIG. 1.

FIG. 2 is an enlarged view of portion A of FIG. 1.

As shown in FIGS. 1 and 2, at the lower end portion in the axis L direction of the outer cylinder 6 (the lower cylindrical portion 62), a caulking portion 64 is formed which is bent inward in the radial direction at a predetermined angle (for example, 45 degrees). The caulking portion 64 is fixed to the lower end portion in the axis L direction of the outer peripheral wall portion 53 of the diaphragm ring 50 by caulking. The caulking portion 64 is formed over the entire periphery of the outer cylinder 6. In addition, a convex portion 65 is provided on the inner peripheral surface of the caulking portion 64 so as to protrude therefrom and to extend over the entire periphery.

The inner cylinder 7 is a member that extends in a direction orthogonal to the axis L (the depth direction of the figure), and has a substantially rectangular through-hole 70 in a cross-sectional view which is open at both ends thereof in the extension direction of the inner cylinder 7. Coating rubbers 71 and 72 are respectively formed on the inner peripheral surface of the through-hole 70 and the outer peripheral surface of the inner cylinder 7. The coating rubber 71 that coats the inner peripheral surface of the through-hole 70 is provided with a plurality of convex strip portions 73 formed in parallel at intervals, which extend in the direction orthogonal to the axis L. On the lower side in the axis L direction of the inner cylinder 7, a protruding portion 74 that protrudes downward is provided.

The elastic body 8 is formed in a substantially thick cylindrical shape, and the outside diameter thereof increases from the upper end side to the lower end side in the axis L direction. A liquid chamber formation portion 34 having a concave shape is formed at the center portion of the lower end surface of the elastic body 8, and a thin cylindrical coating rubber 63 that extends downward from the outer peripheral side of the liquid chamber formation portion 34 is integrally formed in the elastic body 8. The outer peripheral surface of the coating rubber 63 is bonded to the inner peripheral surface of the lower cylindrical portion 62 of the outer cylinder 6 by vulcanization. The outer peripheral surface on the lower end side in the axis L direction of the elastic body 8 is bonded to the inner peripheral sides of the upper cylindrical portion 61 and the dent portion 60 in the outer cylinder 6 by vulcanization, and the internal space of the outer cylinder 6 has a shape that is reduced in diameter into an uneven shape at the dent portion 60. On the other hand, the inner peripheral surface of the upper end side in the axis L direction of the elastic body 8 is bonded to enclose the outer peripheral side of the protruding portion 74 of the inner cylinder 7 by vulcanization. Accordingly, the upper end side of the axis L direction of the upper cylindrical portion 61 is blocked by the elastic body 8, and the outer and inner cylinders 6 and 7 are elastically connected to each other.

The diaphragm 5 blocks the opening end on the lower end side in the axis L direction of the outer cylinder 6. The diaphragm 5 includes: the diaphragm ring 50 fitted to the inner side of the lower cylindrical portion 62 of the outer cylinder 6; and a diaphragm rubber 51 formed on the inner side in the radial direction of the diaphragm ring 50.

The diaphragm ring 50 is an annular ring metal fitting disposed to have the axis L as the central axis thereof, and is an annular hard member configured of a hard body which is harder than the rubber elastic body of which the elastic body 8, a main partition plate 46 described later, and the like are configured. The diaphragm ring 50 is a member formed in a concave shape in a cross-sectional view, and includes: an annular bottom wall portion 52 disposed coaxially with the axis L; a cylindrical outer peripheral wall portion 53 that stands upright from the outer edge portion of the bottom wall portion 52 along the axis L direction; and a cylindrical inner peripheral wall portion 54 (support portion) that stands upright from the inner edge portion of the bottom wall portion 52 along the axis L direction. That is, the diaphragm ring 50 has a configuration in which a concave groove 57 surrounded by the bottom wall portion 52, the outer peripheral wall portion 53, and the inner peripheral wall portion 54 extends in the peripheral direction.

The outer peripheral wall portion 53 is disposed on the inner side of the lower cylindrical portion 62 of the outer cylinder 6, and is interposed between the dent portion 60 and the caulking portion 64 of the outer cylinder 6. The upper end surface of the outer peripheral wall portion 53 abuts on the lower surface of the coating rubber 63 (rubber layer) that coats the dent portion 60, and the lower end surface of the outer peripheral wall portion 53 abuts on the inner peripheral surface of the caulking portion 64 via a coating rubber 55 (rubber layer) of the diaphragm ring 50 described later. The inner peripheral wall portion 54 has a smaller length in the axis L direction than the outer peripheral wall portion 53, and between the upper end surface of the inner peripheral wall portion 54 and the lower surface of the coating rubber 63 coating the dent portion 60, a gap is provided in which a partition plate 45 of the partition member 4 described later is disposed. In addition, in the inner peripheral wall portion 54, a sub-liquid chamber side orifice opening (not shown) that causes an orifice passage 10 described later and the sub-liquid chamber 9B to communicate is formed. The sub-liquid chamber side orifice opening is formed by cutting out a part of the inner peripheral portion 54 in the radial direction. Through the sub-liquid chamber side orifice opening, the inner side of the concave groove 57 of the diaphragm ring 50 and the sub-liquid chamber 9B communicate.

On the surface of the diaphragm ring 50, a coating rubber 55 formed integrally with the diaphragm rubber 51 is formed. The coating rubber 55 is bonded to the upper and lower surfaces of the bottom wall portion 52, the inner and outer peripheral surfaces of the outer peripheral wall portion 53, and the inner and outer peripheral surfaces of the inner peripheral wall portion 54 over the entire peripheries by vulcanization. On the outside surface of the coating rubber 55, a convex portion 56 locked to the convex portion 65 of the outer cylinder 6 is formed over the entire periphery. The convex portion 56 of the diaphragm ring 50 is formed at an angular part between the bottom wall portion 52 and the outer peripheral wall portion 53 in the coating rubber 55.

As shown in FIG. 1, the diaphragm rubber 51 is a thin film rubber which is deformable through a change in the liquid pressure (internal pressure) of the sub-liquid chamber 9B and is bulged out toward the upper side into a round plate shape. The outer peripheral portion of the diaphragm rubber 51 is integrated with the coating rubber 55 of the diaphragm ring 50 over the entire periphery, and the inner side of the diaphragm ring 50 is blocked by the diaphragm rubber 51. The outer peripheral portion of the diaphragm rubber 51 is connected to the angular part between the bottom wall portion 52 and the inner peripheral wall portion 54 in the coating rubber 55.

The region surrounded by the liquid chamber formation portion 34 of the elastic body 8 and the diaphragm 5 is configured as the liquid chamber 9 in which a liquid is sealed. The liquid chamber 9 is divided into the main liquid chamber 9A on the rebound side and the sub-liquid chamber 9B on the bound side by the partition member 4 disposed in the liquid chamber 9. A portion of the partition wall (upper wall) of the main liquid chamber 9A is formed of the elastic body 8, and the internal volume of the main liquid chamber 9A varies with the deformation of the elastic body 8. The sub-liquid chamber 9B is a chamber in which a portion of the partition wall (lower wall) is formed of the diaphragm 5, and the internal volume of the sub-liquid chamber 9B varies as the diaphragm rubber 51 is deformed with a change in the liquid pressure (internal pressure) of the sub-liquid chamber 9B. As a fluid filling the liquid chamber 9, ethylene glycol, water, or the like is used.

(Partition Member)

The partition member 4 is constituted by the diaphragm ring 50 described above, the coating rubber 55 coating the diaphragm ring 50, and the partition plate 45 disposed to block the concave groove 57 of the diaphragm ring 50.

The partition plate 45 is constituted by the main partition plate 46 disposed coaxially with the axis L in a circular disk shape, and a reinforcement member 47 buried in the main partition plate 46.

The main partition plate 46 is a member which is entirely configured of a rubber elastic body and which is easily elastically deformable. The main partition plate 46 has a configuration in which a substantially circular protruding portion 41 having a smaller diameter than a base portion 40 is provided on the lower surface of the center part in the radial direction of the base portion 40 having a circular shape so as to protrude therefrom. The base portion 40 is press-fitted and fixed to the inner side of the upper end portion of the outer peripheral wall portion 53 of the diaphragm ring 50, and the outer peripheral surface of the base portion 40 comes into close contact with the inner peripheral surface of the upper end portion of the outer peripheral wall portion 53.

In addition, as the opening end of the diaphragm ring 50 having a concave shape in a cross-sectional view is blocked by the base portion 40, the orifice passage 10 that causes the main liquid chamber 9A and the sub-liquid chamber 9B to communicate and is substantially rectangular in a cross-sectional view is configured. That is, the orifice passage 10 is a space surrounded by the base portion 40, the bottom wall portion 52, the outer peripheral wall portion 53, and the inner peripheral wall portion 54, and extends in the peripheral direction of the outer cylinder 6 and the diaphragm ring 50. In addition, in the base portion 40, a main liquid chamber side orifice opening 42 that causes the orifice passage 10 and the main liquid chamber 9A to communicate is formed. The main liquid chamber side orifice opening 42 is formed by cutting out a part of the outer peripheral portion of the base portion 40 and is open toward the main liquid chamber 9A and the concave groove 57 in the axis L direction. That is, the inner side of the concave groove 57 of the diaphragm ring 50 and the main liquid chamber 9A communicate through the main liquid chamber side orifice opening 42.

As described above, the orifice passage 10 communicates with the main liquid chamber 9A through the main liquid chamber side orifice opening 42 formed in the base portion 40, and communicates with the sub-liquid chamber 9B through the sub-liquid chamber side orifice opening (not shown) formed in the inner peripheral wall portion 54. The orifice passage 10 is a liquid passage for attenuating vibration by allowing a liquid flowing through the orifice passage 10 to cause liquid column resonance (resonance phenomenon) when vibration is input to the engine mount 1, and is set (tuned) to respond to the frequency and amplitude of shake vibration which is resonant vibration having a high amplitude and a low frequency band (for example, 8 Hz to 12 Hz).

In addition, the protruding portion 41 of the main partition plate 46 is press-fitted to the inner side of the upper end portion of the inner peripheral wall portion 54 of the diaphragm ring 50, and the outer peripheral surface of the protruding portion 41 comes into close contact with (abuts on) the inner peripheral surface of the upper end portion of the inner peripheral wall portion 54. The partition plate 45 having the above-described configuration is interposed between the dent portion 60 of the outer cylinder 6 and the inner peripheral wall portion 54 of the diaphragm ring 50. The upper surface of the outer peripheral portion of the base portion 40 abuts on the lower surface of the coating rubber 63 coating the dent portion 60, and the lower surface of the base portion 40 at the outer periphery of the protruding portion 41 abuts on the upper end surface of the inner peripheral wall portion 54 through the coating rubber 55 of the diaphragm ring 50.

Figure 3:
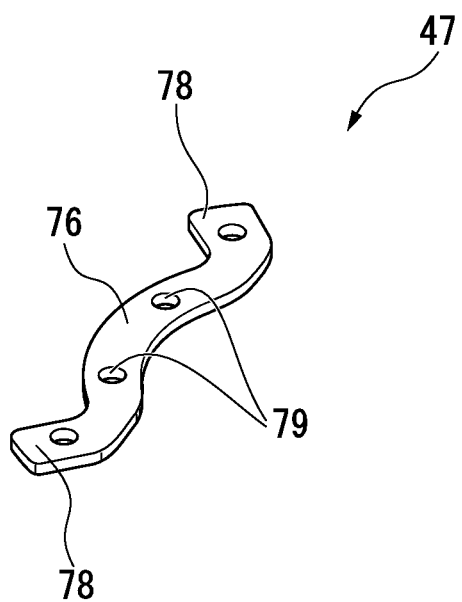
FIG. 3 is a perspective view of a reinforcement member according to the first embodiment.

FIG. 3 is a perspective view of the reinforcement member.

Here, as shown in FIGS. 1 and 3, the reinforcement member 47 is made of a hard body such as a metal and is buried in the main partition plate 46 so as to surround the peripheral edge portion of the main liquid chamber side orifice opening 42.

The reinforcement member 47 is a member in which an arc portion 76 disposed at the peripheral edge portion on the inner side in the radial direction of the main liquid chamber side orifice opening 42 in the main partition plate 46 and a pair of extending portions 78 that extends outward in the radial direction from both ends in the peripheral direction of the arc portion 76 are integrally formed. In addition, the entire periphery of the reinforcement member 47 is buried in the main partition plate 46 made of the rubber elastic body, and the reinforcement member 47 is not exposed to the liquid chamber 9 or the orifice passage 10.

The arc portion 76 is a circular arc flat plate formed at a slightly wider angular range than the formation range of the main liquid chamber side orifice opening 42 in the peripheral direction. In addition, the arc portion 76 is disposed to overlap the inner peripheral wall portion 54 of the diaphragm ring 50 in the plan view (as viewed in the axial direction). The inner peripheral edge of the arc portion 76 extends to a position reaching the sub-liquid chamber 9B in the plan view, and the outer peripheral edge thereof is disposed above the inner peripheral wall portion 54 of the diaphragm ring 50.

The extending portions 78 are flat plates that extend outward in the radial direction from the outer peripheral edges of both ends in the peripheral direction of the arc portion 76, and the tip ends thereof extend to the outer peripheral edge of the main partition plate 46 through the peripheral edge portions on both sides in the peripheral direction of the main liquid chamber side orifice opening 42 in the main partition plate 46.

As described above, the arc portion 76 is disposed at the peripheral edge portion on the inner side in the radial direction of the main liquid chamber side orifice opening 42 in the main partition plate 46, and the extending portions 78 are disposed at the peripheral edge portions on both sides in the peripheral direction of the main liquid chamber side orifice opening 42 in the main partition plate 46, such that the reinforcement member 47 is disposed to surround the peripheral edge portion of the main liquid chamber side orifice opening 42.

In addition, in the reinforcement member 47, a plurality of through-holes 79 which penetrate the reinforcement member 47 in the thickness direction (the axis L direction) are formed in the peripheral direction. The through-holes 79 are filled with a constituent material (vulcanized rubber) of the main partition plate 46 when the reinforcement member 47 is formed in the main partition plate 46 by vulcanization.

(Method of Manufacturing Engine Mount)

Next, a method of manufacturing the engine mount 1 described above will be described.

First, a process of forming the body rubber 2 including the outer cylinder 6, the inner cylinder 7, and the elastic body 8 is performed.

The outer cylinder 6 and the inner cylinder 7 are disposed at predetermined positions in a mold for molding the elastic body 8, the coating rubbers 71 and 72 of the inner cylinder 7, and the coating rubber 63 of the outer cylinder 6, and adhesives are respectively applied to the inner peripheral surface of the outer cylinder 6, the outer peripheral surface of the inner cylinder 7, and the inner peripheral surface of the through-hole 70 of the inner cylinder 7. Thereafter, vulcanized rubber is poured into the above-mentioned mold for vulcanization molding of the elastic body 8 and the coating rubbers 63, 71, and 72. In addition, the mold is detached after the above-mentioned elastic body 8 and the like harden. Accordingly, the body rubber 2 is manufactured.

On the other hand, a process of forming the diaphragm 5 including the diaphragm ring 50 and the diaphragm rubber 51 is performed.

The diaphragm ring 50 is disposed at a predetermined position in a mold for molding the diaphragm rubber 51 and the coating rubber 55 of the diaphragm ring 50, and an adhesive is applied to the surface of the diaphragm ring 50. Thereafter, vulcanized rubber is poured into the mold for vulcanization molding of the diaphragm rubber 51 and the coating rubber 55. In addition, the mold is detached after the diaphragm rubber 51 and the like harden. Accordingly, the diaphragm 5 is manufactured.

As described above, the diaphragm rubber 51 and the diaphragm ring 50 are formed integrally with each other by the coating rubber 55, and thus the number of components constituting the engine mount 1 can be reduced, thereby simplifying the configuration of the engine mount 1 and reducing the number of assembly processes. Therefore, a reduction in the manufacturing cost of the engine mount 1 can be achieved, and the productivity of the engine mount 1 can be enhanced.

Subsequently, a process of forming the partition plate 45 including the reinforcement member 47 and the main partition plate 46 is performed.

The reinforcement member 47 is disposed at a predetermined position in a mold for molding the main partition plate 46, and thereafter vulcanized rubber is poured into the mold for vulcanization molding of the main partition plate 46. Here, when the vulcanized rubber is poured into the mold, the through-hole 79 of the reinforcement member 47 is also filled with the vulcanized rubber. As a result, the rubber elastic bodies at the upper and lower surfaces of the main partition plate 46 are connected through the through-hole 79. Accordingly, without adding an adhesive treatment to the reinforcement member 47, the movement in the axial direction and the peripheral direction of the reinforcement member 47 in the main partition plate 46 can be restricted, thereby reducing the material cost. Therefore, due to the addition of the reinforcement member 47, the manufacturing cost can be kept to a minimum.

In addition, the mold is detached after the main partition plate 46 hardens. Accordingly, the partition plate 45 is manufactured.

Next, a process of manufacturing the partition wall 4 by assembling the above-mentioned diaphragm 5 with the partition plate 45 is performed.

The base portion 40 of the partition plate 45 is press-fitted to the inner side of the upper end portion of the outer peripheral wall portion 53 of the diaphragm ring 50, and the protruding portion 41 of the partition plate is press-fitted to the inner side of the upper end portion of the inner peripheral wall portion 54 of the diaphragm ring 50. Accordingly, the base portion 40 is placed at the upper end surface of the inner peripheral wall portion 54, and the outer peripheral surface of the base portion 40 comes into close contact with the inner peripheral surface of the outer peripheral wall portion 53, thereby forming the orifice passage 10. Here, the relative positions of the main liquid chamber side orifice opening 42 formed in the main partition plate 46 and the sub-liquid chamber side orifice opening (not shown) formed in the diaphragm ring 50 are determined so that the flow passage length of the orifice passage 10 is a predetermined length.

Next, a process of assembling the partition member 4 and the diaphragm 5 with the body rubber 2 as described above is performed.

The diaphragm ring 50 is press-fitted to the inner side of the lower cylindrical portion 62, the coating rubber 55 of the outer peripheral surface of the outer peripheral wall portion 53 of the diaphragm ring 50 is caused to come into close contact with the coating rubber 63 of the inner peripheral surface of the lower cylindrical portion 62, and the upper end surface of the outer peripheral wall portion 53 of the diaphragm ring 50 and the upper surface of the outer peripheral portion of the base portion 40 are caused to abut on the lower end surface of the coating rubber 63 of the dent portion 60. Accordingly, the upper end of the outer peripheral wall portion 53 is locked to the dent portion 60, and the outer peripheral portion of the partition plate 45 is interposed between the dent portion 60 and the inner peripheral wall portion 54. As described above, as the partition plate 45 is clamped between the dent portion 60 and the inner peripheral wall portion 54, the partition plate 45 can be pressed from both sides thereof in the axis L direction, and thus the sealability of the partition plate 45 can be enhanced even with a smaller pressing force than that according to related art.

Subsequently, the lower end portion (the caulking portion 64) of the lower cylindrical portion 62 is bent inward in the radial direction, the convex portion 65 of the caulking portion 64 and the convex portion 56 of the coating rubber 55 of the diaphragm ring 50 are locked to each other, and the lower end portion of the lower cylindrical portion 62 and the lower end portion of the outer peripheral wall portion 53 are fixed by caulking. Accordingly, the outer peripheral wall portion 53 is interposed between the dent portion 60 and the caulking portion 64. Here, by adjusting the bent status of the caulking portion 64, the clamping force of the dent portion 60 and the caulking portion 64 on the outer peripheral wall portion 53 can be easily adjusted, thereby ensuring sealability with a desired clamping force. In addition, as described above, even though the clamping force of the outer peripheral wall portion 53 is increased by changing the bent status of the caulking portion 64, the clamping force of the inner peripheral wall portion 54 and the dent portion 60 on the partition plate 45 is not increased, thereby rarely affecting the partition plate 45.

Next, a process of reducing the diameter of the lower cylindrical portion 62 of the outer cylinder 6 toward the inner side in the radial direction (narrowing process) is performed.

The diameter of the lower cylindrical portion 62 is reduced by applying pressure to the lower cylindrical portion 62 toward the inner side in the radial direction from the outer side in the radial direction, for example, through eight-directional narrowing or the like. Accordingly, a pre-compression force is applied to the coating rubbers 55 and 63 interposed between the lower cylindrical portion 62 and the outer peripheral wall portion 53, thereby enhancing the sealability between the lower cylindrical portion 62 and the outer peripheral wall portion 53. The sealability is appropriately adjusted by adjusting the amount of diameter reduced by the above-mentioned narrowing process. In addition, even though the narrowing process is performed as described above, the clamping force of the inner peripheral wall portion 54 and the dent portion 60 on the partition plate 45 is not substantially changed, thereby rarely affecting the partition plate 45. In addition, in a case where sufficient sealability is obtained only by press-fitting the outer peripheral wall portion 53 to the inner side of the lower cylindrical portion 62, it is possible to omit the narrowing process.

Next, a process of sealing the liquid in the liquid chamber 9 is performed.

The inside of the liquid chamber 9 formed on the inner side of the outer cylinder 6 is vacuumized, the inside of the liquid chamber 9 is filled with the liquid by injecting the liquid from a liquid injection port (not shown) into the vacuumized liquid chamber 9, and thereafter the liquid chamber 9 is sealed by blocking the liquid injection port.

Accordingly, the manufacturing of the engine mount 1 is completed.

(Actions)

Next, the actions of the engine mount 1 will be described.

In the engine mount 1 described above, vibration from the engine in the vehicle is transmitted to the inner cylinder 7 through the engine bracket (not shown) and is further transmitted from the inner cylinder 7 to the elastic body 8 such that the elastic body 8 is elastically deformed. Here, the elastic body 8 acts as a main vibration-absorbing member, and thus vibration is absorbed by a vibration absorption action based on the internal friction and the like of the elastic body 8. Therefore, vibration that is transmitted from the outer cylinder 6 to the vehicle body side through the vehicle body bracket (not shown) is reduced.

In addition, when shake vibration which has a relatively low frequency and a high amplitude is input to the engine mount 1, the elastic body 8 is elastically deformed by this shake vibration, and a relatively large change in liquid pressure occurs in the main liquid chamber 9A. Therefore, large increases and decreases in the liquid pressure in the main liquid chamber 9A are periodically repeated. Here, the liquid in the liquid chamber 9 is alternately circulated through the orifice passage 10 between the main liquid chamber 9A and the sub-liquid chamber 9B. Since the orifice passage 10 is tuned so as to respond to shake vibration, when the liquid in the liquid chamber 9 is circulated through the orifice passage 10 between the main liquid chamber 9A and the sub-liquid chamber 9B as described above, liquid column resonance is caused in the liquid flowing through the orifice passage 10. Therefore, the shake vibration input to the engine mount 1 is attenuated by the liquid column resonance in the orifice passage 10, and thus the shake vibration transmitted to the vehicle body side is reduced.

On the other hand, when idle vibration which has a relatively high frequency (for example, 20 Hz to 40 Hz) and a low amplitude is input to the engine mount 1, the elastic body 8 is elastically deformed by this idle vibration, and a relatively small change in the liquid pressure occurs in the main liquid chamber 9A. Therefore, small increases and decreases in the liquid pressure in the main liquid chamber 9A are periodically repeated. At this time, it is difficult for the liquid to flow through the orifice passage 10 tuned to be suitable for shake vibration. However, as the partition plate 45 vibrates in the axis L direction in synchronization with the change in the liquid pressure of the main liquid chamber 9A, the change in the liquid pressure of the main liquid chamber 9A is reduced.

Therefore, the idle vibration input to the engine mount 1 is attenuated by the vibration of the partition plate 45, and thus the idle vibration transmitted to the vehicle body side is reduced.

In addition, when high vibration in the bound direction is input to the engine mount 1, the liquid pressure of the main liquid chamber 9A is rapidly increased, vibration in the rebound direction is thereafter input due to the reaction thereto, and the main liquid chamber 9A has a negative pressure, there may be cases where a cavitation phenomenon occurs in which a large number of bubbles are generated in the liquid from the main liquid chamber side orifice opening 42 to the main liquid chamber 9A. In the engine mount 1 of this embodiment, since the main partition plate 46 of the partition plate 45 is entirely formed of rubber, a hard member made of a metal or the like is not exposed to the main liquid chamber 9A. Accordingly, the impact of the breakup of bubbles during the cavitation phenomenon is absorbed by the main partition plate 46.

Figure 30:
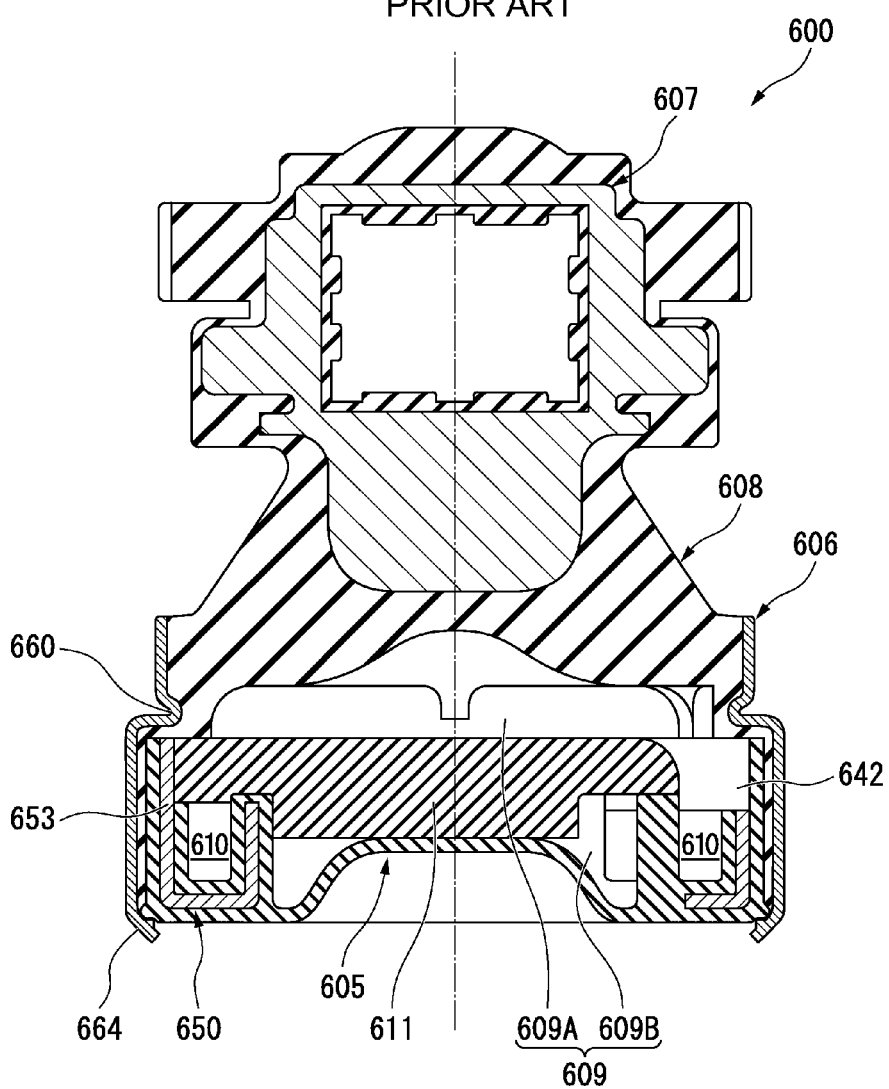
FIG. 30 is a cross-sectional view showing the entire configuration of an engine mount according to the related art.
Figure 31:
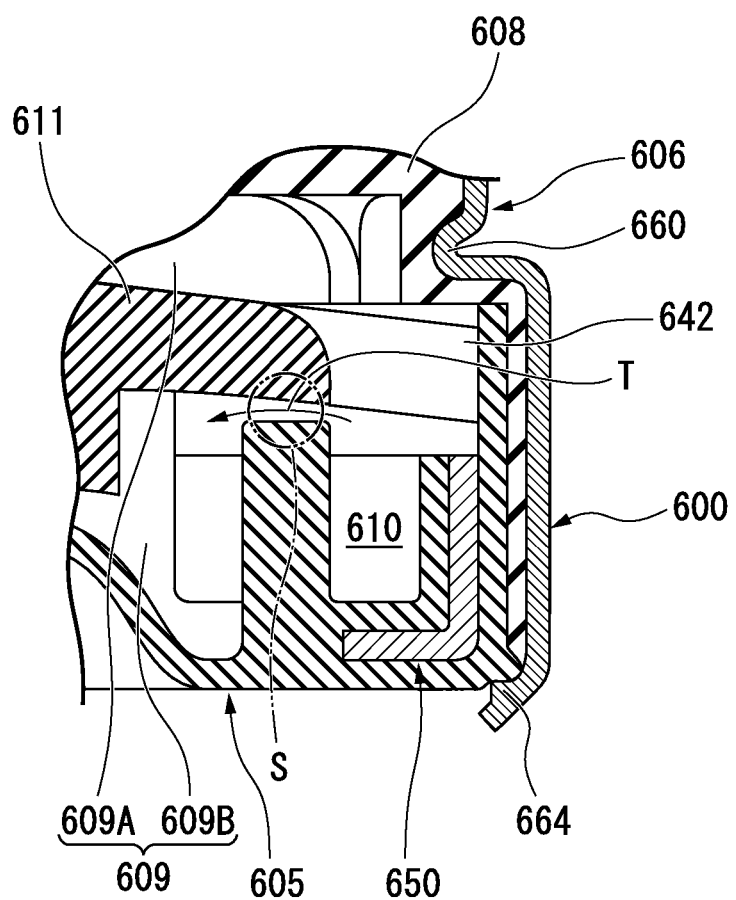
FIG. 31 is a cross-sectional view of the engine mount according to the related art corresponding to FIG. 10 and is an explanatory view for explaining the operations of a partition plate.

By the way, in the engine mount according to the related art, as shown in FIGS. 30 and 31, when the inner cylinder 607 significantly moves relatively upward with respect to the outer cylinder 606 and thus vibration in the rebound direction is input to the engine mount 600, the partition plate 611 rises with respect to the diaphragm ring 650, and there is a possibility that a gap S may be formed at an abutting part of the partition plate 611 and the diaphragm ring 650. As a result, there is a possibility that the sealability between the orifice passage 610 formed between the partition plate 611 and the diaphragm ring 650 and the sub-liquid chamber 609B may not be maintained and both the liquid chambers 609A and 609B may be caused to communicate without passing through the orifice passage 610. Consequently, the liquid flowing through the orifice passage 610 directly leaks to the sub-liquid chamber 609B from the communication part (see arrow T in FIG. 31), resulting in degradation in the vibration absorption performance of the engine mount 600.

Figure 4:
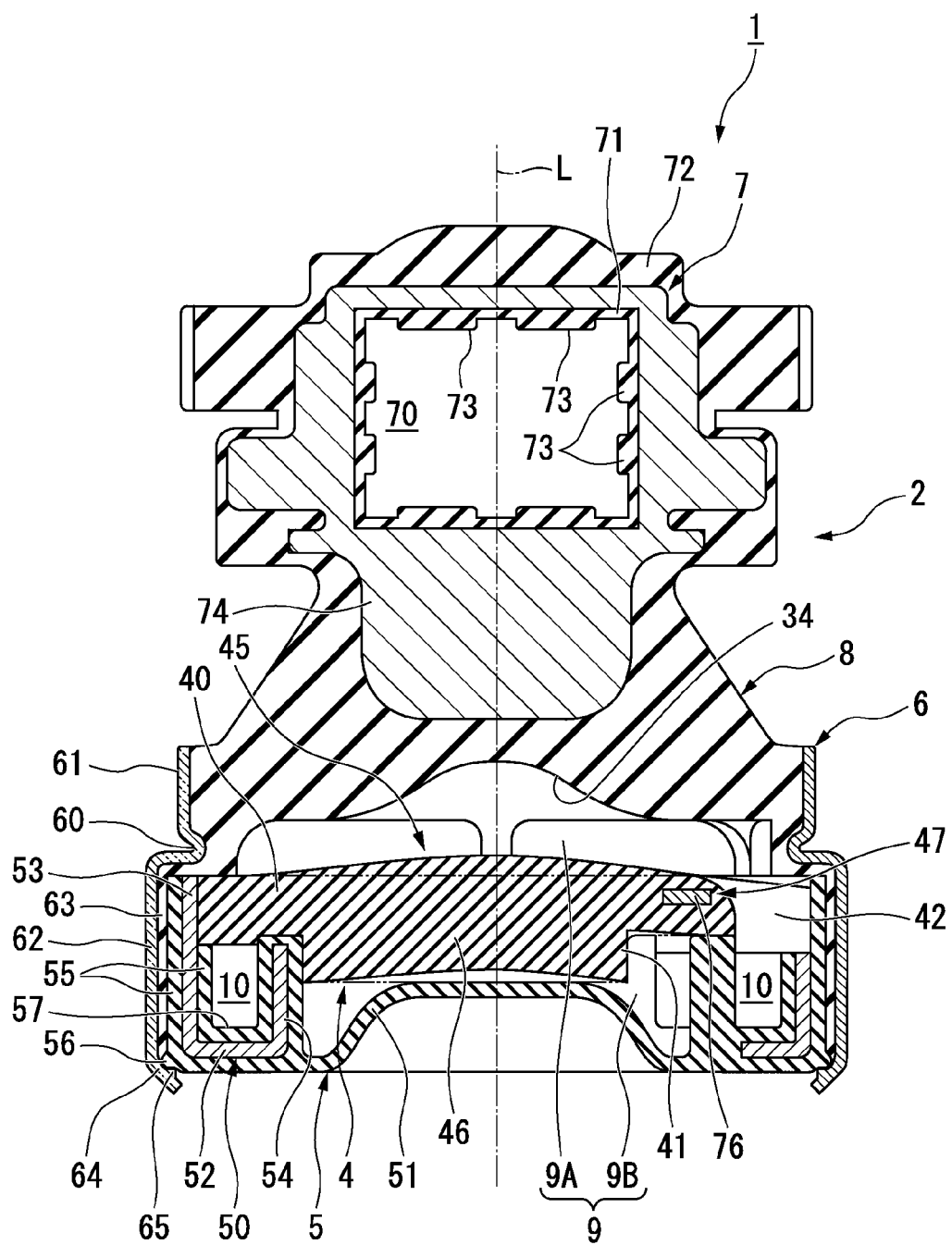
FIG. 4 is a cross-sectional view of the engine mount corresponding to FIG. 1 and is an explanatory view for explaining the operations of a partition plate.

FIG. 4 is a cross-sectional view of the engine mount corresponding to FIG. 1 and is an explanatory view for explaining the operations of the partition plate.

Here, as shown in FIG. 4, when the vibration in the rebound direction is input to the engine mount 1, the center portion in the radial direction of the partition plate 45 is curved upward. In this case, the main partition plate 46 of the partition plate 45 is entirely formed of rubber and is thus smoothly curved to follow the change in the liquid pressure of the main liquid chamber 9A. Moreover, as the reinforcement member 47 is buried in the peripheral edge portion of the main liquid chamber side orifice opening 42 in the main partition plate 46, a part that is not interposed between the orifice passage 10 and the dent portion 60, that is, the peripheral edge portion of the main liquid chamber side orifice opening 42 can be reinforced. That is, the rigidity of the peripheral edge of the main liquid chamber side orifice opening 42 in the main partition plate 46 is increased by the reinforcement member 47, and thus bend of the peripheral edge of the main liquid chamber side orifice opening 42 can be suppressed. As a result, even in a case where high vibration is input to the engine mount 1, the partition plate 45 is prevented from rising from the end surface of the upper end portion in the inner peripheral wall portion 54 of the diaphragm ring 50, and thus the sealability between the main liquid chamber side orifice opening 42 and the inner peripheral wall portion 54 of the diaphragm ring 50 can be maintained. In addition, the reinforcement member 47 is disposed only in the peripheral edge portion of the main liquid chamber side orifice opening 42 and thus does not impede the elastic deformation of the main partition plate 46.

As described above, this embodiment has a configuration in which the reinforcement member 47 is buried in the main partition plate 46 so as to surround the main liquid chamber side orifice opening 42.

In this configuration, even when high vibration is input to the engine mount 1, the partition plate 45 is prevented from rising from the end surface of the upper end portion in the inner peripheral wall portion 54 of the diaphragm ring 50, and thus the sealability between the main liquid chamber side orifice opening 42 and the inner peripheral wall portion 54 of the diaphragm ring 50 can be maintained.

As a result, leakage of the liquid that is present in the orifice passage 10 into the sub-liquid chamber 9B without passing through the orifice passage 10 can be prevented, and thus the vibration absorption performance of the engine mount 1 can be enhanced. In addition, since the reinforcement member 47 is buried in the main partition plate 46, the hard member such as the reinforcement member 47 is not exposed to the main liquid chamber 9A side, and the partition wall of the main liquid chamber 9A is configured only of the rubber elastic body (the elastic body 8 or the main partition plate 46). Therefore, the impact of the breakup of bubbles during the cavitation phenomenon is reliably absorbed by the main partition plate 46, and thus the generation of noise due to the cavitation phenomenon can be suppressed and the sealability of the partition member 4 can also be maintained.

In addition, the outer peripheral wall portion 53 of the diaphragm 5 is disposed inside the lower cylindrical portion 62 of the outer cylinder 6, the dent portion 60 and the caulking portion 64 are provided in the outer cylinder 6, and the outer peripheral wall portion 53 is interposed between the dent portion 60 and the caulking portion 64. Therefore, it is easy to enhance the sealability between the outer cylinder 6 and the diaphragm 5. That is, since it is possible to enhance the sealability by performing the narrowing process on the lower cylindrical portion 62 as described above, only the sealability can be easily enhanced without changing the clamping force of the main partition plate 46 which is entirely formed of rubber.

Moreover, the diaphragm ring 50 is formed in the concave shape in a cross-sectional view, the opening end of the diaphragm ring 50 having the concave shape in the cross-sectional view is blocked by the partition plate 45, and the orifice passage 10 is formed by the partition plate 45 and the diaphragm ring 50. Therefore, an additional orifice member or the like having the orifice passage is unnecessary. As a result, the number of components can be reduced, the configuration of the engine mount 1 is simplified, and the number of assembly processes is reduced. Therefore, a reduction in the cost of the engine mount 1 can be achieved, and the productivity of the engine mount 1 can be enhanced.

In addition, according to the engine mount 1 described above, since the coating rubbers 55 and 63 are interposed between the outer peripheral wall portion 53 of the diaphragm ring 50 and the lower cylindrical portion 62 of the outer cylinder 6, the coating rubbers 55 and 63 function as the buffer materials, and thus impact due to contact between the outer peripheral wall portion 53 and the lower cylindrical portion 62 is suppressed. In addition, transmission of the impact of the breakup of bubbles during the cavitation phenomenon to the outer cylinder 6 is suppressed, and thus the generation of noise can be sufficiently suppressed. In addition, adhesion is increased by the coating rubbers 55 and 63, and thus the sealability between the outer peripheral wall portion 53 and the lower cylindrical portion 62 is enhanced. Therefore, the sealing performance of the liquid chamber 9 can be enhanced.

Second Embodiment

Figure 5:
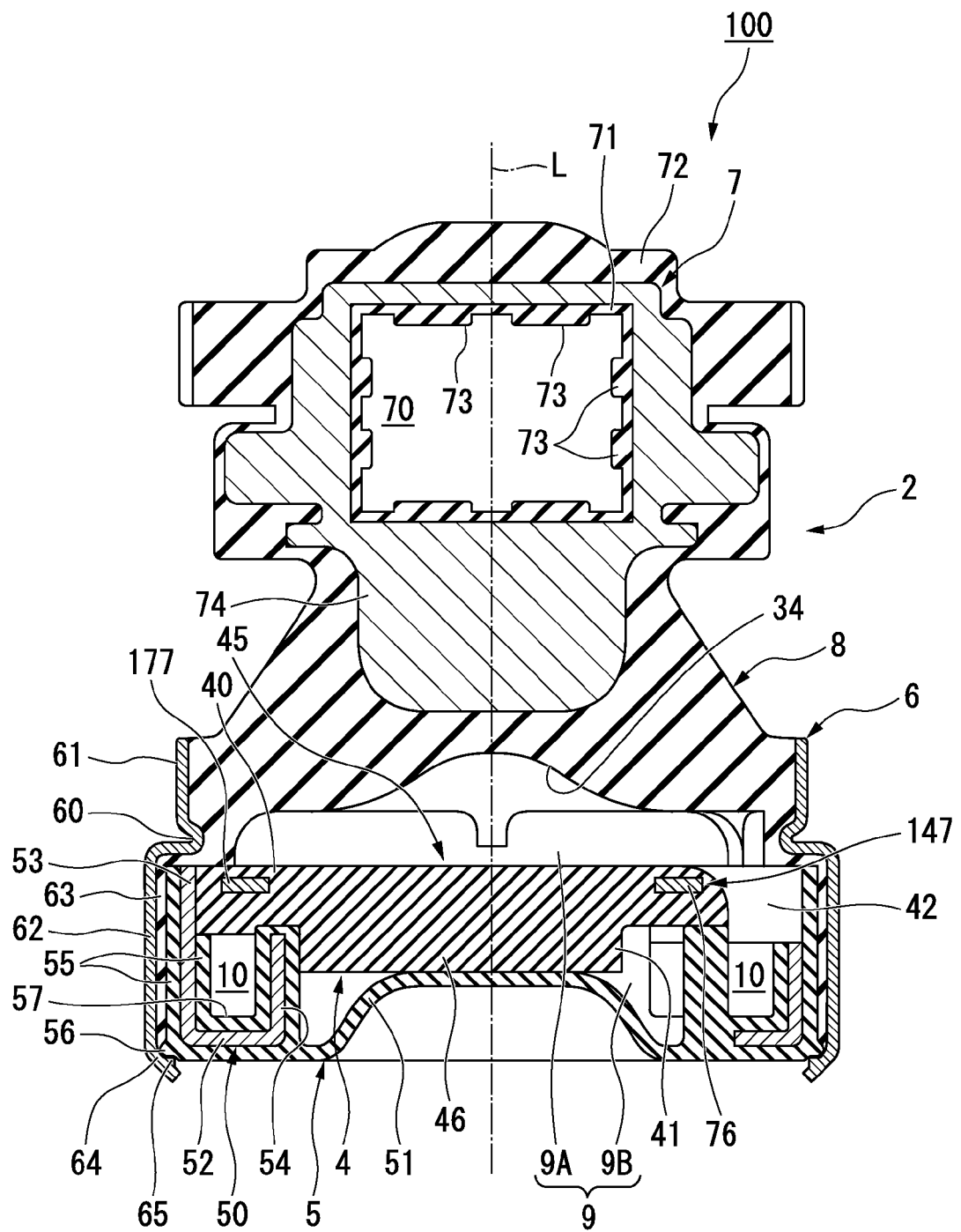
FIG. 5 is a cross-sectional view showing the entire configuration of an engine mount according to a second embodiment of the present invention.
Figure 6:
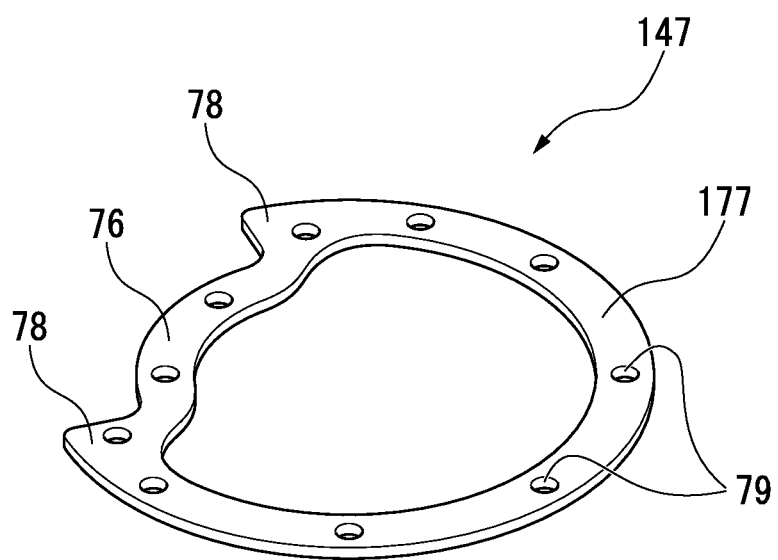
FIG. 6 is a perspective view of a reinforcement member according to the second embodiment.

Next, a second embodiment of the present invention will be described. FIG. 5 is a cross-sectional view of an engine mount in the second embodiment, and FIG. 6 is a perspective view of a reinforcement member. In the above-described embodiment, the configuration in which the reinforcement member 47 that reinforces only the peripheral edge portion of the main liquid chamber side orifice opening 42 is buried in the main partition plate 46 is described. In contrast, this embodiment is different from the above-described first embodiment in that an annular reinforcement member which is buried over the entire periphery in the peripheral direction of the main partition plate 46 is used. In addition, in the following description, the same elements as those in the first embodiment described above are denoted by the same reference numerals, and description thereof will be omitted.

As shown in FIGS. 5 and 6, a reinforcement member 147 of an engine mount 100 (antivibration device) in this embodiment is a member which is made of a hard body such as a metal and is buried in the base portion 40 of the main partition plate 46 on the outer peripheral side. The reinforcement member 147 includes: a first arc portion 76 disposed to overlap the inner peripheral wall portion 54 of the diaphragm ring 50 in the plan view (as viewed in the axial direction); extending portions 78 that extend outward in the radial direction from both ends in the peripheral direction of the first arc portion 76; and a second arc portion 177 disposed to overlap the concave groove 57 (the orifice passage 10) in the plan view (as viewed in the axial direction). That is, the reinforcement member 147 is an annular (substantially D-shaped in the plan view) member continuously formed along the outer peripheral edge of the main partition plate 46 in a state of avoiding the formation area of the main liquid chamber side orifice opening 42.

First, the first arc portion 76 and the extending portions 78 have the same configurations as those of the arc portion 76 and the extending portions 78 in the above-described first embodiment.

The second arc portion 177 is an arc-shaped flat plate buried in the outer peripheral side of the base portion 40 over the entire region excluding the above-mentioned main liquid chamber side orifice opening 42 and is disposed to be interposed between the elastic body 8 and the diaphragm ring 50 in the axial direction. In addition, both end portions of the second arc portion 177 are respectively connected to the tip ends of the extending portions 78 on both sides in the peripheral direction of the main liquid chamber side orifice opening 42.

Therefore, both the end portions of the second arc portion 177 described above, the extending portions 78, and the first arc portion 76 are disposed to surround the peripheral edge portion of the main liquid chamber side orifice opening 42 from the outer peripheral side of the main partition plate 46.

As described above, in this embodiment, the same effects as those of the above-described first embodiment are obtained, and furthermore, since the second arc portion 177 is buried in the outer peripheral edge of the main partition plate 46, the rigidity of the press-fit part when the partition plate 45 is press-fitted into the diaphragm ring 50 (the outer peripheral wall portion 53) can be enhanced. Accordingly, the press-fitting load exerted on the main partition plate 46 is increased during assembly of the diaphragm ring 50 and the partition plate 45, and thus assembly characteristics when the main partition plate 46 is press-fitted into the outer peripheral wall portion 53 can be enhanced. That is, deformation and the like of the main partition plate 46 can be prevented during the assembly of the main partition plate 46 and the diaphragm ring 50. In addition, after the partition plate 45 and the diaphragm ring 50 are assembled, separation of them from the integrated state is suppressed, and thus the management and transport of components become easy.

Moreover, in this embodiment, the first arc portion 76 and the second arc portion 177 described above are integrally formed as the reinforcement member 47, and thus the number of components and the number of assembly processes can be reduced. Therefore, a reduction in manufacturing cost can be achieved, and looseness of the reinforcement member 47 in the main partition plate 46 can be prevented.

While the first and second embodiments of the engine mount according to the present invention have been described, the present invention is not limited to the above-described embodiments, and may be appropriately modified in a range without departing from the concept thereof.

For example, in the above-described embodiments, the engine (not shown) which is a vibration-generating source is connected to the inner cylinder 7 with the engine side bracket, and the vehicle body (not shown) which is the vibration-receiving section is connected to the outer cylinder 6 with the vehicle body side bracket and the like. However, according to the present invention, the vibration-receiving section may be connected to the inner cylinder 7, and the vibration-generating source may be connected to the outer cylinder 6 with the engine side bracket and the like.

In addition, in the above-described embodiments, the anti-vibration device that is applied as the engine mount of a vehicle is described. However, it is possible to apply the antivibration device according to the present invention to those other than the engine mount. For example, it is possible to apply the antivibration device according to the present invention to the mount of a power generator mounted in a construction machine or to the mount of a machine installed in a factory or the like.

In addition, in the above-described embodiments, a configuration is provided in which the inner cylinder 7 extends in the direction orthogonal to the axis L and the press-fitting portion of the engine side bracket is press-fitted to the inner side of the inner cylinder 7. However, according to the present invention, the inner cylinder 7 may be arranged coaxially with the outer cylinder 6, or a configuration may also be employed in which an inner cylinder having a female threaded portion is provided and the bracket is attached as a bolt is screwed to the female threaded portion.

In addition, in the above-described embodiments, the diaphragm 5 having the diaphragm rubber 51 in a shape in which the center part is bulged out is provided. However, according to the present invention, the diaphragm is not limited to the above-described configuration, and a configuration is possible in which a bulged part is not formed at the center part of the diaphragm rubber and the diaphragm rubber is provided inside the diaphragm ring 50 in a loose state.

In addition, in the above-described embodiments, a vacuum injection method of vacuumizing the liquid chamber 9 and injecting the liquid thereto after assembling the body rubber 2, the partition member 4, and the diaphragm 5 is employed. However, according to the present invention, it is possible to employ an in-liquid assembly method in which the liquid chamber 9 is filled with the liquid by assembling the body rubber 2, the partition member 4, and the diaphragm member 5 described above in the liquid filling the liquid chamber 9.

In this case, since the second arc portion 177 is disposed inside the main partition plate 46 in the engine mount 100 described above, after the partition plate 45 and the diaphragm ring 50 are assembled, separation of them from the integrated state is suppressed. Therefore, the transport of the components during in-liquid transport becomes easy.

In addition, in the above-described embodiments, a compression-type engine mount 1 which is mounted and installed so that the main liquid chamber 9A is positioned on the upper side in the vertical direction and the sub-liquid chamber 9B is positioned on the lower side in the vertical direction is described. However, it is possible to apply the present invention to a suspension-type engine mount which is mounted and installed so that the main liquid chamber 9A is positioned on the lower side in the vertical direction and the sub-liquid chamber 9B is positioned on the upper side in the vertical direction.

Figure 7:
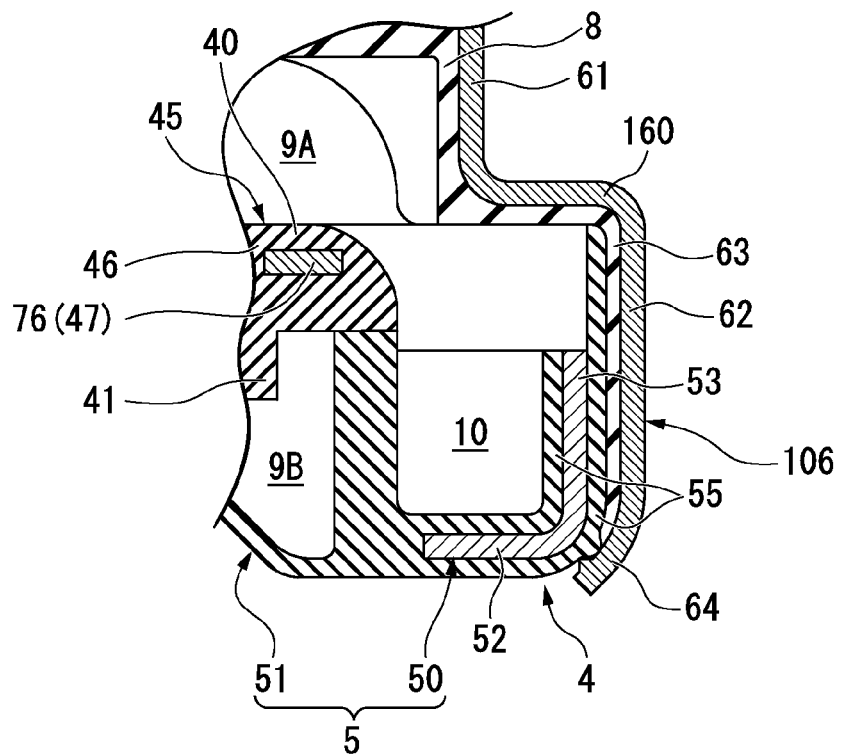
FIG. 7 is a partially enlarged cross-sectional view of an engine mount for explaining another embodiment of the present invention.
Figure 8:
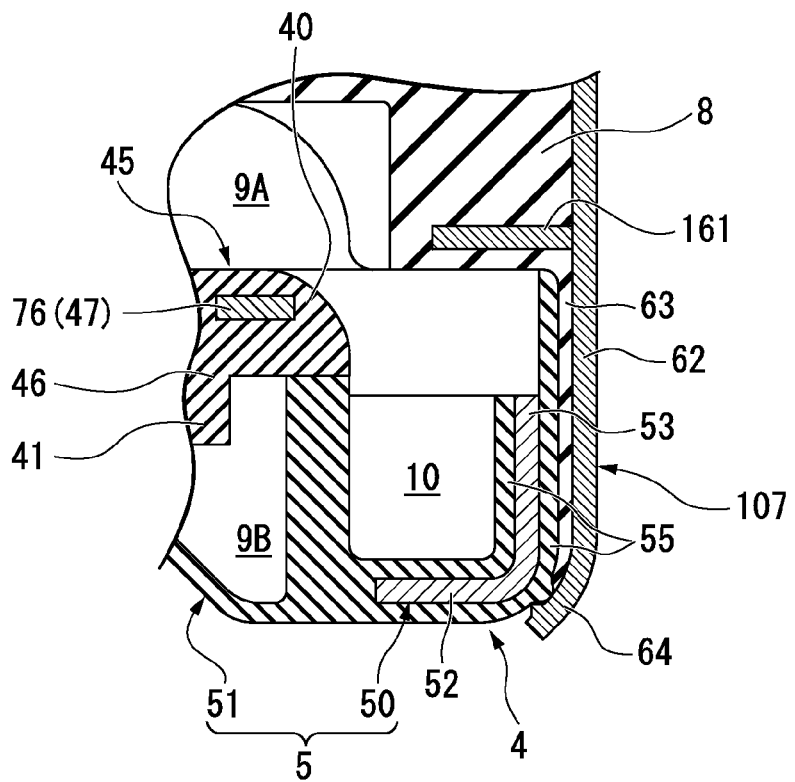
FIG. 8 is a partially enlarged cross-sectional view of an engine mount for explaining another embodiment of the present invention.

In addition, in the above-described embodiments, the dent portion 60 of which the diameter is reduced toward the inner side in the radial direction is formed in the outer cylinder 6, and the outer peripheral wall portion 53 is interposed and the partition member 4 is interposed by the dent portion 60. However, the present invention is not limited to the configuration in which the above-mentioned dent portion 60 is formed, and a locking portion or a protruding portion which has a different shape may also be formed as a locking portion for locking the upper end of the outer peripheral wall portion 53 or a protruding portion for interposing the partition plate 45. For example, as the locking portion or the protruding portion described above, as shown in FIG. 7, an outer cylinder 106 having an uneven portion 160 formed between the upper and lower cylindrical portions 61 and 62 may be provided, and as shown in FIG. 8, a flange portion 161 which protrudes from the inner peripheral surface of an outer cylinder 107 may be formed. In addition, according to the present invention, the locking portion for locking the upper end of the outer peripheral wall portion 53 and the protruding portion for interposing the partition plate 45 may be separately formed.

Figure 9:
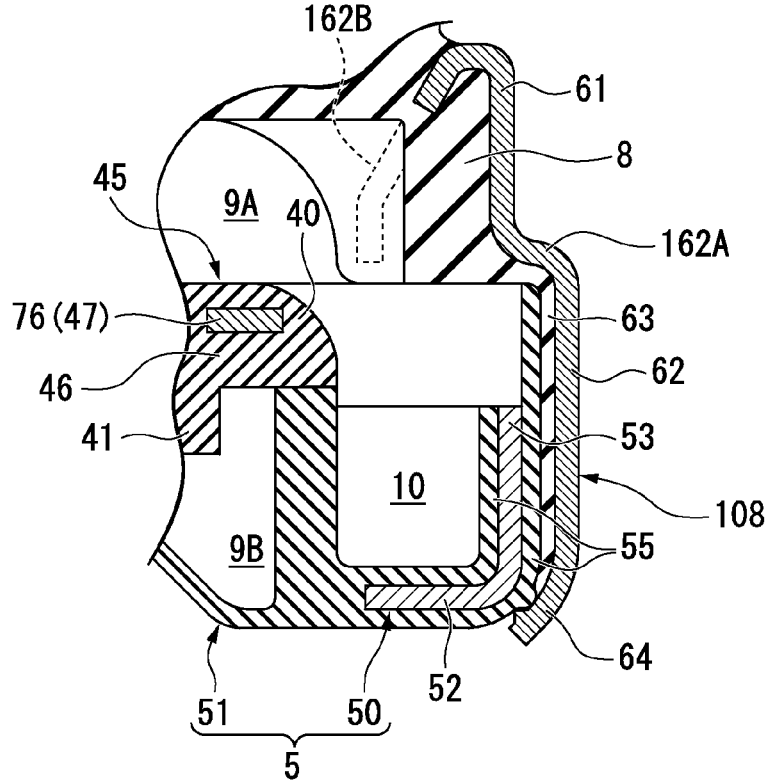
FIG. 9 is a partially enlarged cross-sectional view of an engine mount for explaining another embodiment of the present invention.

For example, as shown in FIG. 9, a configuration may also be provided in which a locking portion 162A having an uneven shape is formed at the intermediate part of an outer cylinder 108 and a protruding portion 162B having a tapered shape in which the diameter thereof is gradually reduced toward the lower side is formed at the upper end portion of the outer cylinder 108.

Figure 10:
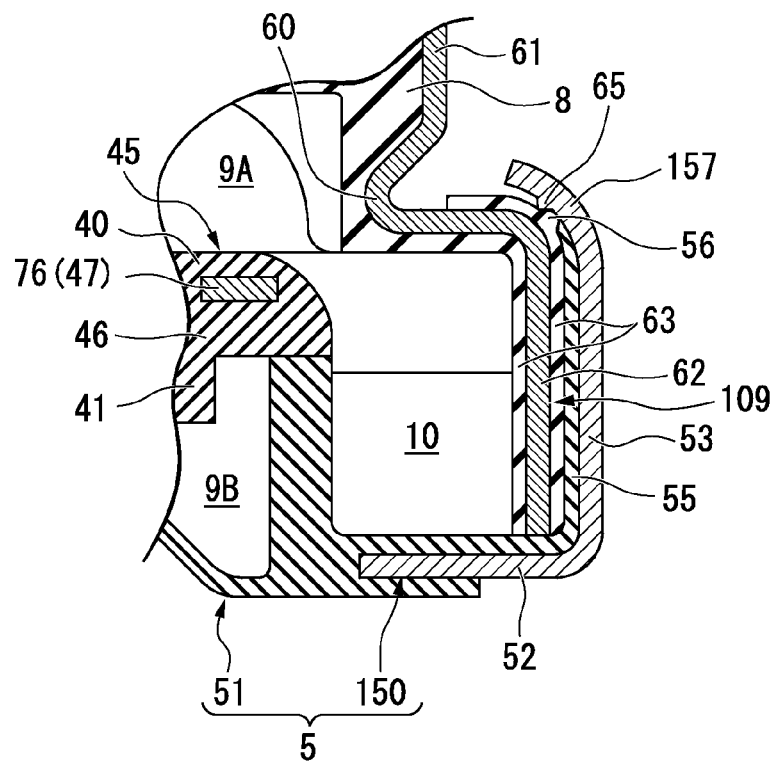
FIG. 10 is a partially enlarged cross-sectional view of an engine mount for explaining another embodiment of the present invention.

In addition, in the above-described embodiments, the outer peripheral wall portion 53 (second cylindrical portion) of the diaphragm ring 50 is disposed inside the lower cylindrical portion 62 (first cylindrical portion) of the outer cylinder 6, the dent portion 60 and the caulking portion 64 are provided in the outer cylinder 6, and the outer peripheral wall portion 53 is interposed between the dent portion 60 and the caulking portion 64. However, according to the present invention, the first cylindrical portion may be disposed inside the second cylindrical portion. For example, as shown in FIG. 10, the lower cylindrical portion 62 of an outer cylinder 109 may be fitted to the inner side of the outer peripheral wall portion 53 of a diaphragm ring 150. In this case, the bottom wall portion 52 of the diaphragm ring 150 functions as the locking portion, and the lower end of the lower cylindrical portion 62 abuts on the upper surface of the bottom wall portion 52. In addition, a caulking portion 157 is formed at the upper end portion of the outer peripheral wall portion 53, and the upper end portion of the lower cylindrical portion 62 is fixed by the caulking portion 157 for caulking. Accordingly, the lower cylindrical portion 62 is interposed between the bottom wall portion 52 and the caulking portion 157 described above. However, in this case, it is difficult to perform the narrowing process on the outer peripheral wall portion 53 as in the above-described embodiments, and thus sealability may not be easily enhanced. Therefore, it is preferable that the outer peripheral wall portion 53 is disposed inside the lower cylindrical portion 62 as in the above-described embodiments.

Figure 11:
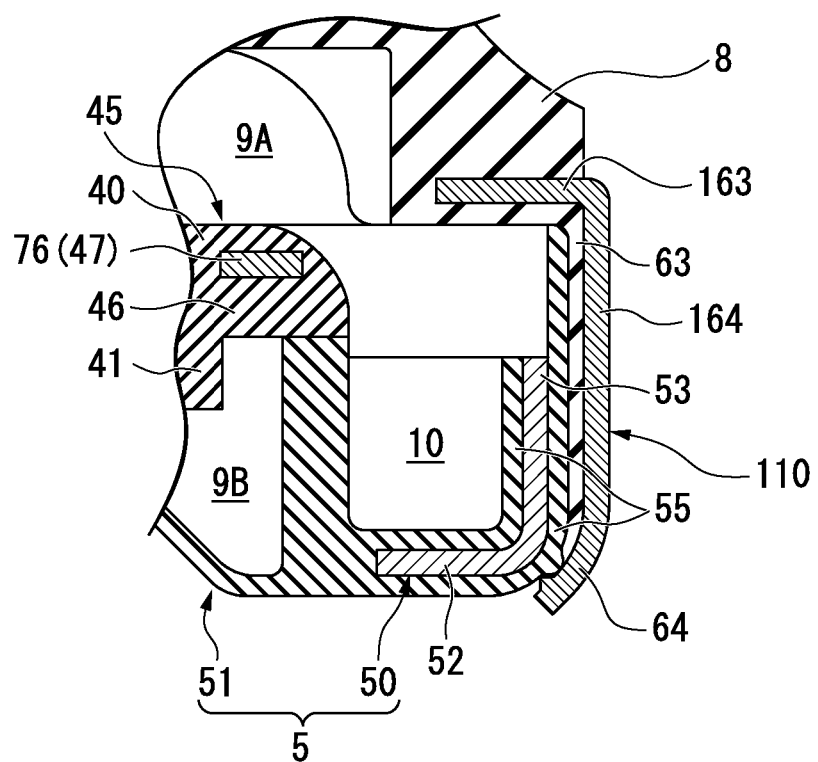
FIG. 11 is a partially enlarged cross-sectional view of an engine mount for explaining another embodiment of the present invention.

In addition, in the above-described embodiments, a configuration is provided in which the outer cylinder 6 is provided with the dent portion 60 between the upper and lower cylindrical portions 61 and 62. However, according to the present invention, it is possible to omit the upper cylindrical portion 61. For example, as shown in FIG. 11, a configuration may also be provided in which a flange portion 163 (protruding portion, locking portion) which protrudes inward in the radial direction is provided at the upper end of an outer cylinder 110 (first cylindrical portion 164) and the caulking portion 64 is provided at the lower end of the outer cylinder 110 (first cylindrical portion 164). Accordingly, the length in the axis L direction of the engine mount 1 is reduced, thereby achieving a reduction in size. The first cylindrical portion 164 is narrowed inward in the radial direction and is press-fitted to the inner side of a bracket (not shown).

In addition, in the above-described embodiments, the diaphragm rubber 51 and the diaphragm ring 50 are integrally formed. However, according to the present invention, it is possible to provide the diaphragm ring 50 separately from the diaphragm rubber 51.

In addition, in the above-described embodiments, the opening end of the diaphragm ring 50 having the concave shape in a cross-sectional view is blocked by the partition plate 45 and the orifice passage 10 is formed by the partition plate 45, the bottom wall portion 52, the outer peripheral wall portion 53, and the inner peripheral wall portion 54. However, the present invention is not limited to the diaphragm ring 50 having the above-described shape, and a diaphragm ring 50 having a different shape may also be employed.

In addition, in the above-described embodiments, a configuration is provided in which the coating rubber 63 is formed on the inner peripheral surface of the lower cylindrical portion 62, the coating rubber 55 is formed on the outer peripheral surface of the outer peripheral wall portion 53, and the coating rubbers 55 and 63 are interposed between the lower cylindrical portion 62 and the outer peripheral wall portion 53. However, a configuration may also be employed in which a coating rubber is formed on only one of the lower cylindrical portion 62 and the outer peripheral wall portion 53, or a configuration is possible in which no rubber layer is interposed between the lower cylindrical portion 62 and the outer peripheral wall portion 53.

In addition, it is not preferable to expose the reinforcement member 147 to the inside of the liquid chamber 9 or the orifice passage 10. However, there is no problem with exposing the outer peripheral edge of the reinforcement member 147 to the inner peripheral surface of the outer peripheral wall portion 53 of the diaphragm ring 50. In this case, when the partition plate 45 is press-fitted to the inner side of the outer peripheral wall portion 53, metals come into contact with each other during press-fitting, and thus the press-fitting load of the partition plate 45 is increased. Therefore, the diaphragm ring 50 and the partition plate 45 can be reliably assembled.

Third Embodiment

Figure 12:
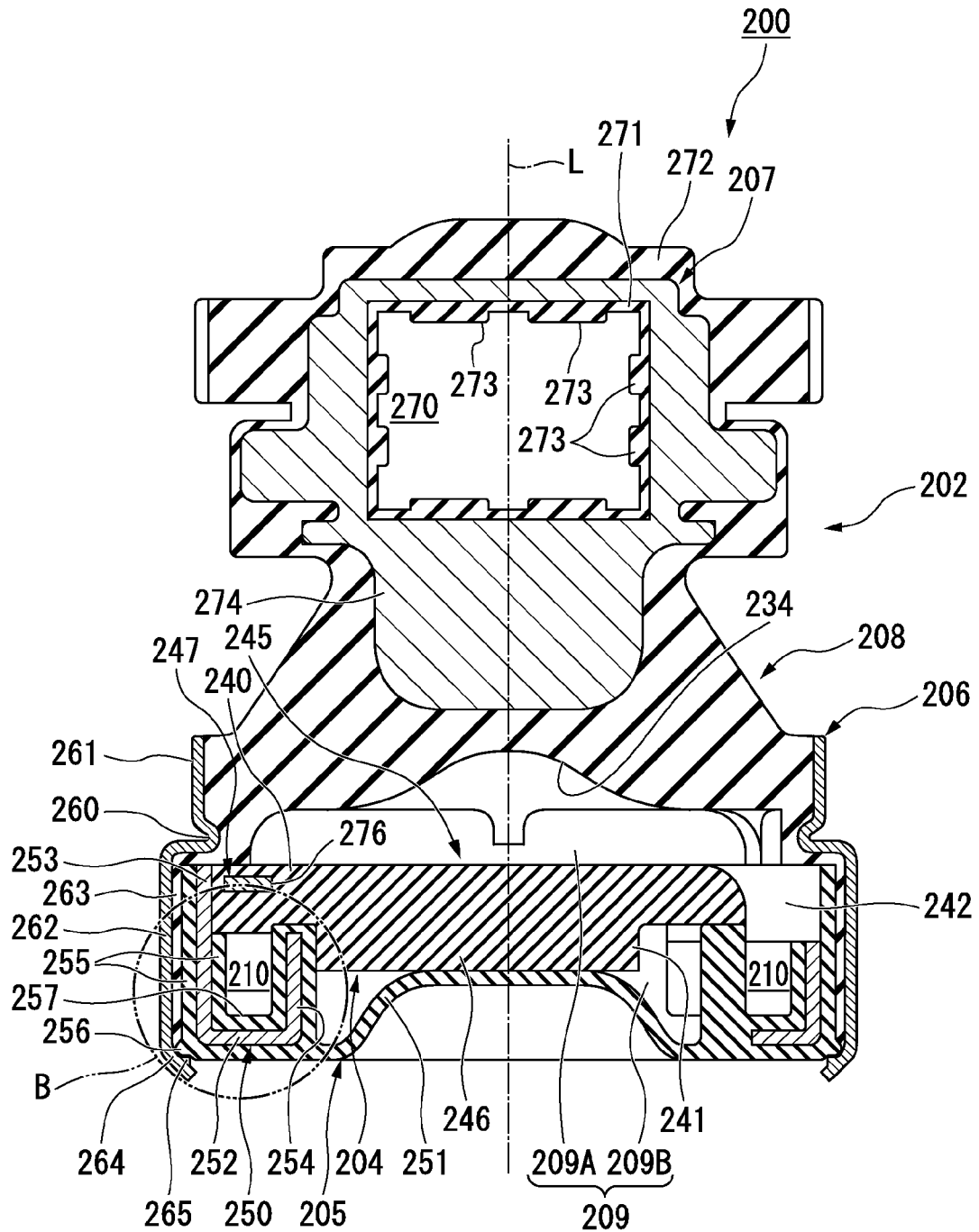
FIG. 12 is a cross-sectional view showing the entire configuration of an engine mount according to a third embodiment of the present invention.

FIG. 12 is a cross-sectional view of an engine mount according to a third embodiment.

In this embodiment, the lower side in FIG. 12 is referred to as a bound side, that is, a direction in which a static load (initial load) is input when the engine mount is installed. The upper side in FIG. 12 is referred to as a rebound side, that is, the side opposite the static load input direction. In addition, reference sign L shown in FIG. 12 denotes the central axis of an outer cylinder 206 described later and is simply described as axis L.

As shown in FIG. 12, an engine mount (antivibration device) 200 is used for mounting an engine which is an example of a vibration-generating section to a vehicle body which is an example of a vibration-receiving section. The engine mount 200 is a device for attenuating the vibration of the vibration-generating section.

The engine mount 200 has a configuration in which a partition member 204 and a diaphragm 205 are assembled with a body rubber 202. The engine mount 200 mainly includes: an outer cylinder 206 (first mounting member) connected to the vehicle body (not shown) with a vehicle body bracket (not shown); an inner cylinder (second mounting member) 207 disposed on the upper side in the axis L direction of the outer cylinder 206 and connected to the engine (not shown) with an engine bracket (not shown); an elastic body 208 disposed between the outer cylinder 206 and the inner cylinder 207 and made of a rubber elastic body; the diaphragm 205 provided at the lower end in the axis L direction of the outer cylinder 206; and the partition member 204 which divides a liquid chamber 209 formed between the elastic body 208 and the diaphragm 205 into a main liquid chamber 209A and a sub-liquid chamber 209B and is provided with an orifice passage (restriction passage) 210 that causes the main liquid chamber 209A and the sub-liquid chamber 209B to communicate. In addition, the body rubber 202 described above is constituted by the outer cylinder 206, the inner cylinder 207, and the elastic body 208.

The outer cylinder 206 is a substantially cylindrical metal fitting of which both ends in the axis L direction are open. The outer cylinder 206 includes: an annular dent portion 260 (protruding portion, locking portion) disposed at the intermediate part thereof in the axis L direction; an upper cylindrical portion 261 formed further to the upper side in the axis L direction than the dent portion 260 in a cylindrical shape; and a lower cylindrical portion 262 (first cylindrical portion) formed further to the lower side than the dent portion 260 in a cylindrical shape.

The dent portion 260 is formed to protrude further toward the inner side in the radial direction than the upper and lower cylindrical portions 261 and 262. The dent portion 260 locks the upper end portion in the axis L direction of an outer peripheral wall portion (second cylindrical portion) 253 of a diaphragm ring (hard member) 250 described later. The dent portion 260 is formed by flexural deformation toward the inner side in the radial direction so as to narrow the outer cylinder 206 in the cylindrical shape, and is formed over the entire periphery of the outer cylinder 206 between the upper and lower cylindrical portions 261 and 262. The lower cylindrical portion 262 is a cylinder portion having a larger diameter than that of the upper cylindrical portion 261, and the diaphragm 205 (the diaphragm ring 250) is fitted therein.

Figure 13:
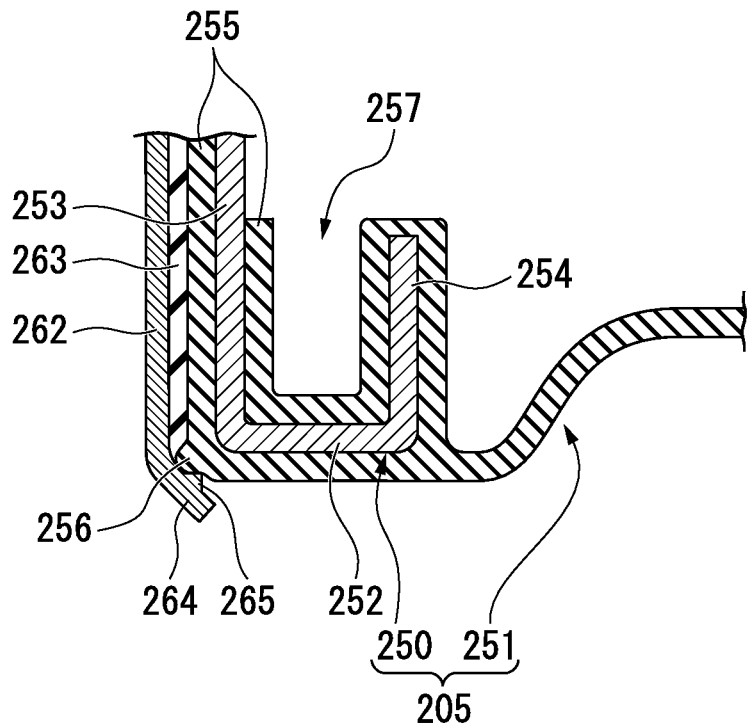
FIG. 13 is an enlarged view of portion B of FIG. 12.

FIG. 13 is an enlarged view of portion B of FIG. 12.

As shown in FIGS. 12 and 13, at the lower end portion in the axis L direction of the outer cylinder 206 (the lower cylindrical portion 262), a caulking portion 264 is formed which is bent inward in the radial direction at a predetermined angle (for example, 45 degrees). The caulking portion 264 is fixed to the lower end portion in the axis L direction of the outer peripheral wall portion 253 of the diaphragm ring 250 by caulking. The caulking portion 264 is formed over the entire periphery of the outer cylinder 206. In addition, a convex portion 265 protrudes from the inner peripheral surface of the caulking portion 264 while extending over the entire periphery.

The inner cylinder 207 is a member that extends in a direction orthogonal to the axis L (the depth direction of the figure), and has a substantially rectangular through-hole 270 in a cross-sectional view which is open at both ends thereof in the extension direction of the inner cylinder 207. Coating rubbers 271 and 272 are respectively formed on the inner peripheral surface of the through-hole 270 and the outer peripheral surface of the inner cylinder 207. The coating rubber 271 that coats the inner peripheral surface of the through-hole 270 is provided with a plurality of convex strip portions 273 formed in parallel at intervals, which extend in the direction orthogonal to the axis L. On the lower side in the axis L direction of the inner cylinder 207, a protruding portion 274 that protrudes downward is provided.

The elastic body 208 is formed in a substantially thick cylindrical shape, and the outside diameter thereof is increased from the upper end side to the lower end side in the axis L direction. A liquid chamber formation portion 234 having a concave shape is formed at the center portion of the lower end surface of the elastic body 208, and a thin cylindrical coating rubber 263 that extends downward from the outer peripheral side of the liquid chamber formation portion 234 is integrally formed in the elastic body 208. The outer peripheral surface of the coating rubber 263 is bonded to the inner peripheral surface of the lower cylindrical portion 262 of the outer cylinder 206 by vulcanization. The outer peripheral surface on the lower end side in the axis L direction of the elastic body 208 is bonded to the inner peripheral sides of the upper cylindrical portion 261 and the dent portion 260 in the outer cylinder 206 by vulcanization, and the internal space of the outer cylinder 206 has a shape that is reduced in diameter into an uneven shape at the dent portion 260. On the other hand, the inner peripheral surface of the upper end side in the axis L direction of the elastic body 208 is bonded to enclose the outer peripheral side of the protruding portion 274 of the inner cylinder 207 by vulcanization. Accordingly, the upper end side of the axis L direction of the upper cylindrical portion 261 is blocked by the elastic body 208, and the outer and inner cylinders 206 and 207 are elastically connected to each other.

The diaphragm 205 blocks the opening end on the lower end side in the axis L direction of the outer cylinder 206. The diaphragm 205 includes: the diaphragm ring 250 fitted to the inner side of the lower cylindrical portion 262 of the outer cylinder 206; and a diaphragm rubber 251 formed on the inner side in the radial direction of the diaphragm ring 250.

The diaphragm ring 250 is an annular ring metal fitting disposed to have the axis L as the central axis thereof and is an annular hard member configured of a hard body which is harder than the rubber elastic body of which the elastic body 208, a main partition plate 246 described later, and the like are configured. The diaphragm ring 250 is a member formed in a U-shape in a cross-sectional view, and includes: an annular bottom wall portion 252 disposed coaxially with the axis L; a cylindrical outer peripheral wall portion 253 that stands upright from the outer edge portion of the bottom wall portion 252 along the axis L direction; and a cylindrical inner peripheral wall portion 254 (support portion) that stands upright from the inner edge portion of the bottom wall portion 252 along the axis L direction. That is, the diaphragm ring 250 has a configuration in which a U-shaped groove 257 surrounded by the bottom wall portion 252, the outer peripheral wall portion 253, and the inner peripheral wall portion 254 extends in the peripheral direction.

The outer peripheral wall portion 253 is disposed on the inner side of the lower cylindrical portion 262 of the outer cylinder 206 and is interposed between the dent portion 260 and the caulking portion 264 of the outer cylinder 206. The upper end surface of the outer peripheral wall portion 253 abuts on the lower surface of the coating rubber (rubber layer) 263 that coats the dent portion 260, and the lower end surface of the outer peripheral wall portion 253 abuts on the inner peripheral surface of the caulking portion 264 via a coating rubber (rubber layer) 255 of the diaphragm ring 250 described later. The inner peripheral wall portion 254 has a smaller length in the axis L direction than the outer peripheral wall portion 253, and between the upper end surface of the inner peripheral wall portion 254 and the lower surface of the coating rubber 263 coating the dent portion 260, a gap is provided in which a partition plate 245 of the partition member 204 described later is disposed. In addition, in the inner peripheral wall portion 254, a sub-liquid chamber side orifice opening (not shown) that causes an orifice passage 210 described later and the sub-liquid chamber 209B to communicate is formed. The sub-liquid chamber side orifice opening is formed by cutting out a part of the inner peripheral portion 254 in the radial direction. Through the sub-liquid chamber side orifice opening, the inner side of the U-shaped groove 257 of the diaphragm ring 250 and the sub-liquid chamber 209B communicate.

On the surface of the diaphragm ring 250, a coating rubber 255 formed integrally with the diaphragm rubber 251 is formed. The coating rubber 255 is bonded over the entire peripheries of the upper and lower surfaces of the bottom wall portion 252, the inner and outer peripheral surfaces of the outer peripheral wall portion 253, and the inner and outer peripheral surfaces of the inner peripheral wall portion 254 by vulcanization. On the outside surface of the coating rubber 255, a convex portion 256 locked to the convex portion 265 of the outer cylinder 206 is formed over the entire periphery. The convex portion 256 of the diaphragm ring 250 is formed at an angular part between the bottom wall portion 252 and the outer peripheral wall portion 253 in the coating rubber 255.

As shown in FIG. 12, the diaphragm rubber 251 is a thin film rubber which is deformable through a change in the liquid pressure (internal pressure) of the sub-liquid chamber 209B and is bulged out into a round plate shape. The outer peripheral portion of the diaphragm rubber 251 is integrated with the coating rubber 255 of the diaphragm ring 250 over the entire periphery, and the inner side of the diaphragm ring 250 is blocked by the diaphragm rubber 251. The outer peripheral portion of the diaphragm rubber 251 is connected to the angular part between the bottom wall portion 252 and the inner peripheral wall portion 254 in the coating rubber 255.

The region surrounded by the liquid chamber formation portion 234 of the elastic body 208 and the diaphragm 205 is configured as the liquid chamber 209 in which a liquid is sealed. The liquid chamber 209 is divided into the main liquid chamber 209A on the rebound side and the sub-liquid chamber 209B on the bound side by the partition member 204 disposed in the liquid chamber 209. A portion of the partition wall (upper wall) of the main liquid chamber 209A is formed of the elastic body 208, and the internal volume of the main liquid chamber 209A varies with the deformation of the elastic body 208. The sub-liquid chamber 209B is a chamber in which a portion of the partition wall (lower wall) is formed of the diaphragm 205, and the internal volume of the sub-liquid chamber 209B varies as the diaphragm rubber 251 is deformed with a change in the liquid pressure (internal pressure) of the sub-liquid chamber 209B. As a fluid filling the liquid chamber 209, ethylene glycol, water, or the like is used.

(Partition Member)

The partition member 204 is constituted by the diaphragm ring 250 described above, the coating rubber 255 coating the diaphragm ring 250, and the partition plate 245 disposed to block the U-shaped groove 257 of the diaphragm ring 250.

The partition plate 245 is constituted by the main partition plate 246 disposed coaxially with the axis L in a circular disk shape, and a reinforcement member 247 buried in the main partition plate 246.

The main partition plate 246 is a member which is entirely configured of a rubber elastic body and which is easily elastically deformable. The main partition plate 246 has a configuration in which a substantially circular protruding portion 241 having a smaller diameter than a base portion 240 protrudes from the lower surface of the center part in the radial direction of the base portion 240 having a circular shape. The base portion 240 is press-fitted and fixed to the inner side of the upper end portion of the outer peripheral wall portion 253 of the diaphragm ring 250, and the outer peripheral surface of the base portion 240 comes into close contact with the inner peripheral surface of the upper end portion of the outer peripheral wall portion 253.

In addition, as the opening end of the diaphragm ring 250 having a U-shape in a cross-sectional view is blocked by the base portion 240, the orifice passage 210 that causes the main liquid chamber 209A and the sub-liquid chamber 209B to communicate and is substantially rectangular in a cross-sectional view is configured. That is, the orifice passage 210 is a space surrounded by the base portion 240, the bottom wall portion 252, the outer peripheral wall portion 253, and the inner peripheral wall portion 254, and extends in the peripheral direction of the outer cylinder 206 and the diaphragm ring 250. In addition, in the base portion 240, a main liquid chamber side orifice opening 242 that causes the orifice passage 210 and the main liquid chamber 209A to communicate is formed. The main liquid chamber side orifice opening 242 is formed by cutting out a part of the outer peripheral portion of the base portion 240 and is open to the main liquid chamber 209A and the U-shaped groove 257 in the axis L direction. That is, the inner side of the U-shaped groove 257 of the diaphragm ring 250 and the main liquid chamber 209A communicate through the main liquid chamber side orifice opening 242.

As described above, the orifice passage 210 communicates with the main liquid chamber 209A through the main liquid chamber side orifice opening 242 provided in the base portion 240, and communicates with the sub-liquid chamber 209B through the sub-liquid chamber side orifice opening (not shown) formed in the inner peripheral wall portion 254. The orifice passage 210 is a liquid passage for attenuating vibration by allowing a liquid flowing through the orifice passage 210 to cause liquid column resonance (resonance phenomenon) when vibration is input to the engine mount 200, and is set (tuned) to respond to the frequency and amplitude of shake vibration which is resonant vibration having a high amplitude and a low frequency band (for example, 8 Hz to 12 Hz).

In addition, the protruding portion 241 of the main partition plate 246 is press-fitted to the inner side of the upper end portion of the inner peripheral wall portion 254 of the diaphragm ring 250, and the outer peripheral surface of the protruding portion 241 comes into close contact with (abuts on) the inner peripheral surface of the upper end portion of the inner peripheral wall portion 254. The partition plate 245 having the above-described configuration is interposed between the dent portion 260 of the outer cylinder 206 and the inner peripheral wall portion 254 of the diaphragm ring 250. The upper surface of the outer peripheral portion of the base portion 240 abuts on the lower surface of the coating rubber 263 coating the dent portion 260, and the lower surface of the base portion 240 at the outer periphery of the protruding portion 241 abuts on the upper end surface of the inner peripheral wall portion 254 through the coating rubber 255 of the diaphragm ring 250.

Figure 14:
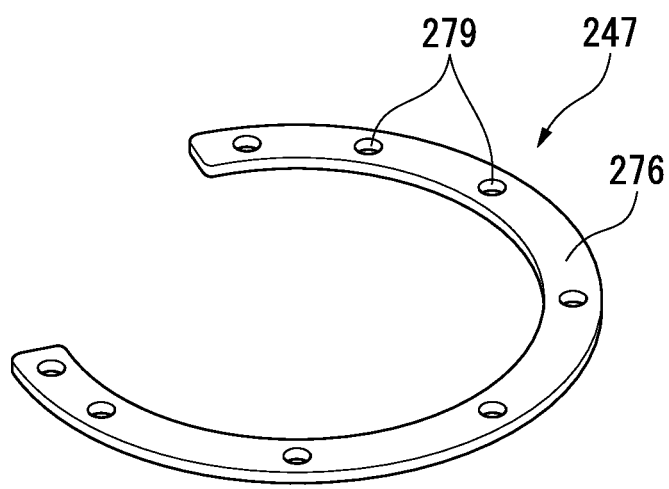
FIG. 14 is a perspective view of a reinforcement member according to the third embodiment.

FIG. 14 is a perspective view of the reinforcement member.

Here, as shown in FIGS. 12 and 14, the reinforcement member 247 is made of a hard body such as a metal and is buried in the main partition plate 246 along the outer peripheral edge of the base portion 240 in the main partition plate 246. The reinforcement member 247 includes a flat plate-like arc portion 276 formed in a C-shape in the plan view (as viewed in the axial direction), and is disposed to overlap the orifice passage 210 in the plan view. The peripheral edge on the inner side in the radial direction of the arc portion 276 extends to a position overlapping the inner peripheral wall portion 254 of the diaphragm ring 250 in the plan view, and the peripheral edge on the outer side in the radial direction thereof extends to a position overlapping the tip end of the dent portion 260.

That is, the arc portion 276 is disposed coaxially with the orifice passage 210 above the orifice passage 210. In addition, both end portions in the peripheral direction of the arc portion 276 respectively extend to the peripheral edges on both sides in the peripheral direction of the main liquid chamber side orifice opening 242. In addition, the entire periphery of the reinforcement member 247 is buried in the main partition plate 246 made of the rubber elastic body, and thus the reinforcement member 247 is not exposed to the liquid chamber 209 or the orifice passage 210.

In addition, in the reinforcement member 247, a plurality of through-holes 279 which penetrate the reinforcement member 247 in the thickness direction (the axis L direction) are formed in the peripheral direction. The through-holes 279 are filled with a constituent material (vulcanized rubber) of the main partition plate 246 when the reinforcement member 247 is formed in the main partition plate 246 by vulcanization.

(Method of Manufacturing Engine Mount)

Next, a method of manufacturing the engine mount 200 described above will be described.

First, a process of forming the body rubber 202 including the outer cylinder 206, the inner cylinder 207, and the elastic body 208 is performed.

The outer cylinder 206 and the inner cylinder 207 are disposed at predetermined positions in a mold for molding the elastic body 208, the coating rubbers 271 and 272 of the inner cylinder 207, and the coating rubber 263 of the outer cylinder 206, and adhesives are respectively applied to the inner peripheral surface of the outer cylinder 206, the outer peripheral surface of the inner cylinder 207, and the inner peripheral surface of the through-hole 270 of the inner cylinder 207. Thereafter, vulcanized rubber is poured into the above-mentioned mold for vulcanization molding of the elastic body 208 and the coating rubbers 263, 271, and 272. In addition, the mold is detached after the above-mentioned elastic body 208 and the like harden. Accordingly, the body rubber 202 is manufactured.

On the other hand, a process of forming the diaphragm 205 including the diaphragm ring 250 and the diaphragm rubber 251 is performed.

The diaphragm ring 250 is disposed at a predetermined position in a mold for molding the diaphragm rubber 251 and the coating rubber 255 of the diaphragm ring 250, and an adhesive is applied to the surface of the diaphragm ring 250. Thereafter, vulcanized rubber is poured into the mold for vulcanization molding of the diaphragm rubber 251 and the coating rubber 255. In addition, the mold is detached after the diaphragm rubber 251 and the like harden. Accordingly, the diaphragm 205 is manufactured.

As described above, the diaphragm rubber 251 and the diaphragm ring 250 are formed integrally with each other by the coating rubber 255, and thus the number of components constituting the engine mount 200 can be reduced, thereby simplifying the configuration of the engine mount 200 and reducing the number of assembly processes. Therefore, a reduction in the manufacturing cost of the engine mount 200 can be achieved, and the productivity of the engine mount 200 can be enhanced.

Subsequently, a process of forming the partition plate 245 including the reinforcement member 247 and the main partition plate 246 is performed.

The reinforcement member 247 is disposed at a predetermined position in a mold for molding the main partition plate 246, and thereafter vulcanized rubber is poured into the mold for vulcanization molding of the main partition plate 246. Here, when the vulcanized rubber is poured into the mold, the through-hole 279 of the reinforcement member 247 is also filled with the vulcanized rubber. As a result, the rubber elastic bodies at the upper and lower surfaces of the main partition plate 246 are connected through the through-hole 279. Accordingly, without adding an adhesive treatment to the reinforcement member 247, the movement in the axial direction and the peripheral direction of the reinforcement member 247 in the main partition plate 246 can be restricted, thereby reducing the material cost. Therefore, the manufacturing cost due to the addition of the reinforcement member 247 can be kept to a minimum.

In addition, the mold is detached after the main partition plate 246 hardens. Accordingly, the partition plate 245 is manufactured.

Next, a process of manufacturing the partition wall 204 by assembling the above-mentioned diaphragm 205 with the partition plate 245 is performed.

The base portion 240 of the partition plate 245 is press-fitted to the inner side of the upper end portion of the outer peripheral wall portion 253 of the diaphragm ring 250, and the protruding portion 241 of the partition plate is press-fitted to the inner side of the upper end portion of the inner peripheral wall portion 254 of the diaphragm ring 250. Accordingly, the base portion 240 is placed at the upper end surface of the inner peripheral wall portion 254, and the outer peripheral surface of the base portion 240 comes into close contact with the inner peripheral surface of the outer peripheral wall portion 253, thereby forming the orifice passage 210. Here, the relative positions of the main liquid chamber side orifice opening 242 formed in the main partition plate 246 and the sub-liquid chamber side orifice opening (not shown) formed in the diaphragm ring 250 are determined so that the flow passage length of the orifice passage 210 is a predetermined length.

Next, a process of assembling the partition member 204 and the diaphragm 205 with the body rubber 202 as described above is performed.

The diaphragm ring 250 is press-fitted to the inner side of the lower cylindrical portion 262, the coating rubber 255 of the outer peripheral surface of the outer peripheral wall portion 253 of the diaphragm ring 250 is caused to come into close contact with the coating rubber 263 of the inner peripheral surface of the lower cylindrical portion 262, and the upper end surface of the outer peripheral wall portion 253 of the diaphragm ring 250 and the upper surface of the outer peripheral portion of the base portion 240 are caused to abut on the lower end surface of the coating rubber 263 of the dent portion 260. Accordingly, the upper end of the outer peripheral wall portion 253 is locked to the dent portion 260, and the outer peripheral portion of the partition plate 245 is interposed between the dent portion 260 and the inner peripheral wall portion 254. As described above, as the partition plate 245 is clamped between the dent portion 260 and the inner peripheral wall portion 254, the partition plate 245 can be pressed from both sides thereof in the axis L direction, and thus the sealability of the partition plate 245 can be enhanced.

Subsequently, the lower end portion (the caulking portion 264) of the lower cylindrical portion 262 is bent inward in the radial direction, the convex portion 265 of the caulking portion 264 and the convex portion 256 of the coating rubber 255 of the diaphragm ring 250 are locked to each other, and the lower end portion of the lower cylindrical portion 262 and the lower end portion of the outer peripheral wall portion 253 are fixed by caulking. Accordingly, the outer peripheral wall portion 253 is interposed between the dent portion 260 and the caulking portion 264. Here, by adjusting the bent status of the caulking portion 264, the clamping force of the dent portion 260 and the caulking portion 264 on the outer peripheral wall portion 253 can be easily adjusted, thereby ensuring sealability with a desired clamping force. In addition, as described above, even though the clamping force of the outer peripheral wall portion 253 is increased by changing the bent status of the caulking portion 264, the clamping force of the inner peripheral wall portion 254 and the dent portion 260 on the partition plate 245 is not increased, thereby rarely affecting the partition plate 245. Moreover, the compression amount of the main partition plate 246 can be restricted by the height of the outer peripheral wall portion 253, and thus the height dimensions (dimensions in the axial direction) of the engine mount 200 can be made uniform.

Next, a process of reducing the diameter of the lower cylindrical portion 262 of the outer cylinder 206 toward the inner side in the radial direction (narrowing process) is performed.

The diameter of the lower cylindrical portion 262 is reduced by applying pressure to the lower cylindrical portion 262 toward the inner side in the radial direction from the outer side in the radial direction, for example, through eight-directional narrowing or the like. Accordingly, a pre-compression force is applied to the coating rubbers 255 and 263 interposed between the lower cylindrical portion 262 and the outer peripheral wall portion 253, thereby enhancing the sealability between the lower cylindrical portion 262 and the outer peripheral wall portion 253. The sealability is appropriately adjusted by adjusting the amount of diameter reduced by the above-mentioned narrowing process. In addition, even though the narrowing process is performed as described above, the clamping force of the inner peripheral wall portion 254 and the dent portion 260 on the partition plate 245 is not substantially changed, thereby rarely affecting the partition plate 245. In addition, in a case where sufficient sealability is obtained only by press-fitting the outer peripheral wall portion 253 to the inner side of the lower cylindrical portion 262, it is possible to omit the narrowing process.

Next, a process of sealing the liquid in the liquid chamber 209 is performed.

The inside of the liquid chamber 209 formed on the inner side of the outer cylinder 206 is vacuumized, the inside of the liquid chamber 209 is filled with the liquid by injecting the liquid from a liquid injection port (not shown) into the vacuumized liquid chamber 209, and thereafter the liquid chamber 209 is sealed by blocking the liquid injection port.

Accordingly, the manufacturing of the engine mount 200 is completed.

(Actions)

Next, the actions of the engine mount 200 will be described.

In the engine mount 200 described above, vibration from the engine in the vehicle is transmitted to the inner cylinder 207 through the engine bracket (not shown) and is further transmitted from the inner cylinder 207 to the elastic body 208 such that the elastic body 208 is elastically deformed. Here, the elastic body 208 acts as a main vibration-absorbing member, and thus vibration is absorbed by a vibration absorption action based on the internal friction and the like of the elastic body 208. Therefore, vibration that is transmitted from the outer cylinder 206 to the vehicle body side through the vehicle body bracket (not shown) is reduced.

In addition, when shake vibration which has a relatively low frequency and a high amplitude is input to the engine mount 200, the elastic body 208 is elastically deformed by this shake vibration, and a relatively large change in liquid pressure occurs in the main liquid chamber 209A. Therefore, large increases and decreases in the liquid pressure in the main liquid chamber 209A are periodically repeated. Here, the liquid in the liquid chamber 209 is alternately circulated through the orifice passage 210 between the main liquid chamber 209A and the sub-liquid chamber 209B. Since the orifice passage 210 is tuned so as to respond to shake vibration, when the liquid in the liquid chamber 209 is circulated through the orifice passage 210 between the main liquid chamber 209A and the sub-liquid chamber 209B as described above, liquid column resonance is caused in the liquid flowing through the orifice passage 210. Therefore, the shake vibration input to the engine mount 200 is attenuated by the liquid column resonance in the orifice passage 210, and thus the shake vibration transmitted to the vehicle body side is reduced.

On the other hand, when idle vibration which has a relatively high frequency (for example, 20 Hz to 40 Hz) and a low amplitude is input to the engine mount 200, the elastic body 208 is elastically deformed by this idle vibration, and a relatively small change in the liquid pressure occurs in the main liquid chamber 209A. Therefore, small increases and decreases in the liquid pressure in the main liquid chamber 209A are periodically repeated. Here, it is difficult for the liquid to flow through the orifice passage 210 tuned to be suitable for shake vibration. However, as the partition plate 245 vibrates in the axis L direction in synchronization with the change in the liquid pressure of the main liquid chamber 209A, the change in the liquid pressure of the main liquid chamber 209A is reduced. Therefore, the idle vibration input to the engine mount 200 is attenuated by the vibration of the partition plate 245, and thus the idle vibration transmitted to the vehicle body side is reduced.

In addition, when high vibration in the bound direction is input to the engine mount 200, the liquid pressure of the main liquid chamber 209A is rapidly increased, vibration in the rebound direction is thereafter input due to the reaction thereto, and the main liquid chamber 209A has a negative pressure, there may be cases where a cavitation phenomenon occurs in which a large number of bubbles are generated in the liquid from the main liquid chamber side orifice opening 242 to the main liquid chamber 209A. In the engine mount 200 of this embodiment, since the main partition plate 246 of the partition plate 245 is entirely formed of rubber, a hard member made of a metal or the like is not exposed to the main liquid chamber 209A. Accordingly, the impact of the breakup of bubbles during the cavitation phenomenon is absorbed by the main partition plate 246.

As described above, in this embodiment, a configuration is provided in which the reinforcement member 247 made of a hard body such as the metal is buried along the outer peripheral edge of the base portion 240.

In this configuration, since the reinforcement member 247 is buried in the outer peripheral edge of the main partition plate 246, the rigidity of the press-fit part when the partition plate 245 is press-fitted into the diaphragm ring 250 (the outer peripheral wall portion 253) can be enhanced. Accordingly, the press-fitting load exerted on the main partition plate 246 is increased during assembly of the diaphragm ring 250 and the partition plate 245, and thus assembly characteristics when the main partition plate 246 is press-fitted into the outer peripheral wall portion 253 can be enhanced. That is, deformation and the like of the main partition plate 246 can be prevented during the assembly of the main partition plate 246 and the diaphragm ring 250, and thus the sealing performance between the partition plate 245 and the diaphragm ring 250 can be ensured, thereby ensuring the sealability of the liquid chamber 209. In addition, separation of the partition plate 245 and the diaphragm ring 250 from the assembled state is suppressed, and thus the management and transport of components become easy.

In addition, the outer peripheral wall portion 253 of the diaphragm 205 is disposed inside the lower cylindrical portion 262 of the outer cylinder 206, the dent portion 260 and the caulking portion 264 are provided in the outer cylinder 206, and the outer peripheral wall portion 253 is interposed between the dent portion 260 and the caulking portion 264. Therefore, it is easy to enhance the sealability between the outer cylinder 206 and the diaphragm 205. That is, as described above, it is possible to enhance the sealability by performing the narrowing process on the lower cylindrical portion 262. Therefore, only the sealability can be easily enhanced without changing the clamping force of the main partition plate 246 which is entirely formed of rubber.

Moreover, the diaphragm ring 250 is formed in the U-shape in a cross-sectional view, the opening end of the diaphragm ring 250 having the U-shape in a cross-sectional view is blocked by the partition plate 245, and the orifice passage 210 is formed by the partition plate 245 and the diaphragm ring 250. Therefore, an additional orifice member or the like having the orifice passage is unnecessary. As a result, the number of components can be reduced, the configuration of the engine mount 200 is simplified, and the number of assembly processes is reduced. Therefore, a reduction in the cost of the engine mount 200 can be achieved, and the productivity of the engine mount 200 can be enhanced.

In addition, according to the engine mount 200 described above, since the coating rubbers 255 and 263 are interposed between the outer peripheral wall portion 253 of the diaphragm ring 250 and the lower cylindrical portion 262 of the outer cylinder 206, the coating rubbers 255 and 263 function as the buffer materials, and thus impact due to contact between the outer peripheral wall portion 253 and the lower cylindrical portion 262 is suppressed. In addition, transmission of the impact of the breakup of bubbles during the cavitation phenomenon to the outer cylinder 206 is suppressed, and thus the generation of noise can be sufficiently suppressed. In addition, adhesion is increased by the coating rubbers 255 and 263, and thus the sealability between the outer peripheral wall portion 253 and the lower cylindrical portion 262 is enhanced. Therefore, the sealability of the liquid chamber 209 can be enhanced.

FIGS. 15 to 18 are enlarged views of engine mounts having other configurations of the third embodiment.

Figure 15:
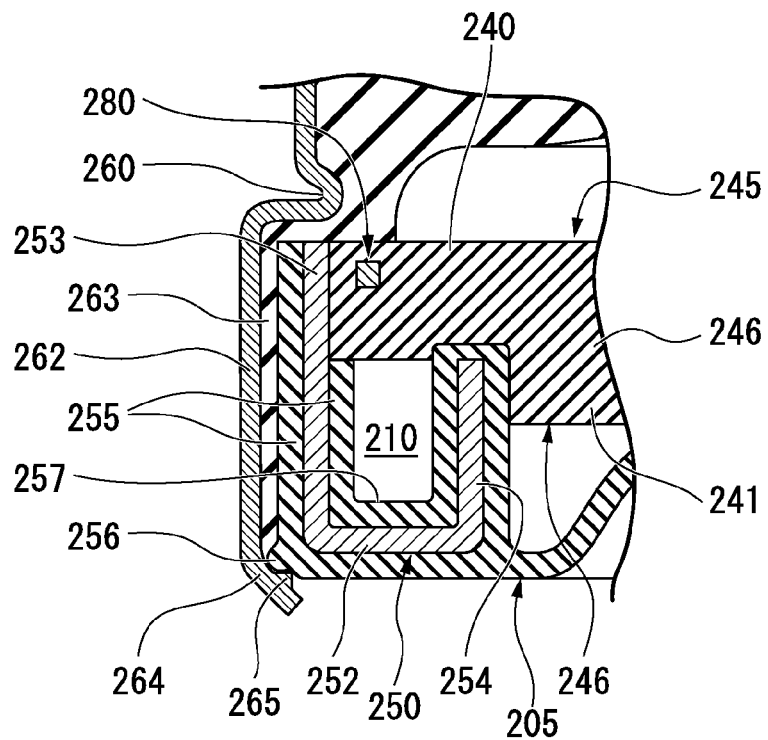
FIG. 15 is a partially enlarged cross-sectional view of an engine mount having another configuration of the third embodiment.
Figure 16:
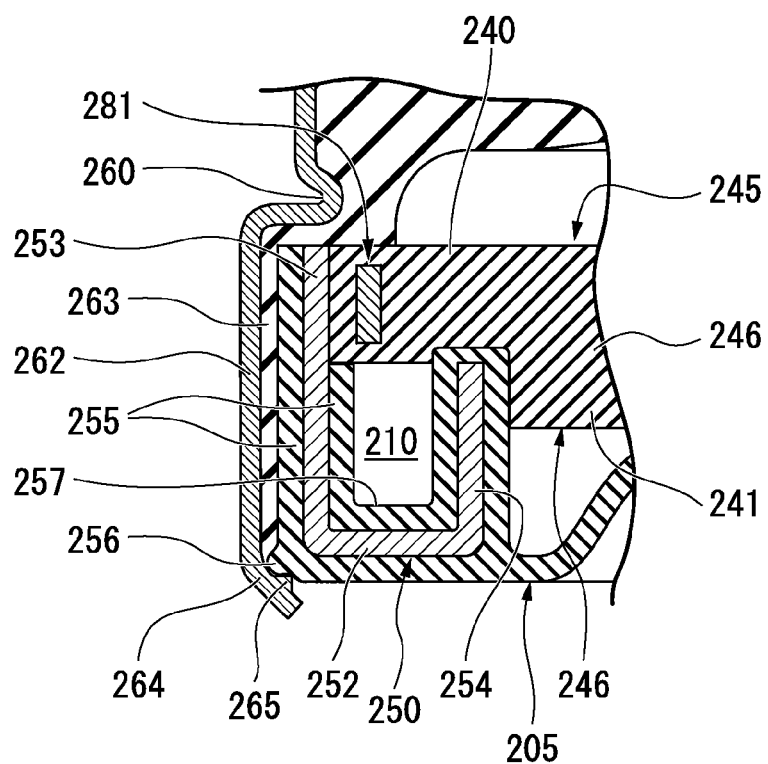
FIG. 16 is a partially enlarged cross-sectional view of an engine mount having another configuration of the third embodiment.

In addition, in the above-described embodiments, the configuration is described in which the flat plate-like reinforcement member 247 is disposed along the outer peripheral edge of the base portion 240. However, as shown in FIG. 15, a configuration may be provided in which a reinforcement member 280 having a wire material shape is disposed in a substantially C-shape in the plan view along the outer peripheral edge of the base portion 240, or a configuration may also be provided in which a cylindrical reinforcement member 281 formed to be long in the axis L direction is formed in a substantially C-shape in the plan view and the reinforcement member 281 is disposed coaxially with the base portion 240. Even in this case, the same effects as those of the third embodiment described above can be obtained.

Figure 17:
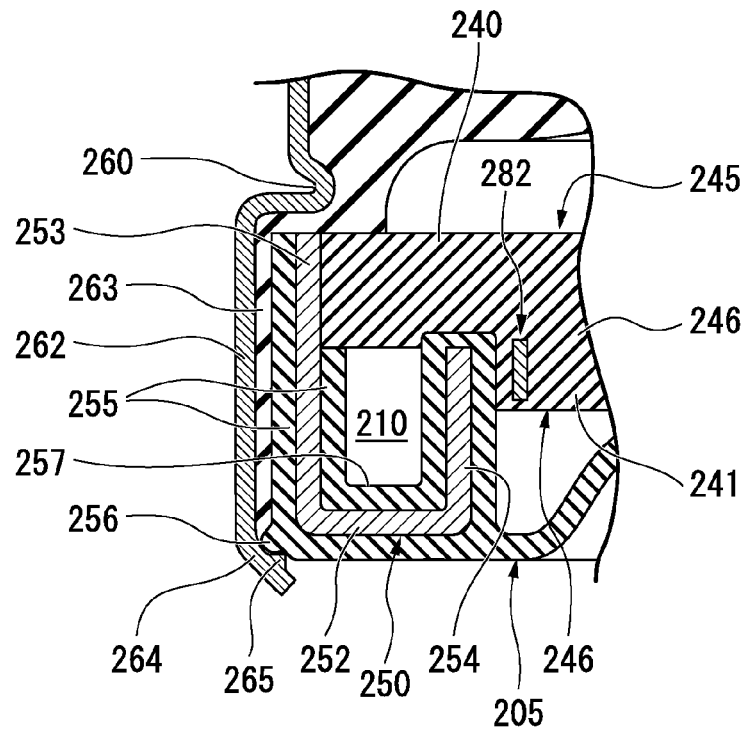
FIG. 17 is a partially enlarged cross-sectional view of an engine mount having another configuration of the third embodiment.

In addition, a configuration may also be provided in which a reinforcement member 282 is buried in the outer peripheral edge of the protruding portion 241 as long as the buried place is in the outer peripheral edge of the partition plate 245. Specifically, as shown in FIG. 17, a configuration may also be provided in which the cylindrical reinforcement member 282 is buried in the outer peripheral edge of the protruding portion 241, coaxially with the protruding portion 241.

In this configuration, the rigidity of the press-fit part when the protruding portion 241 of the partition plate 245 is press-fitted into the diaphragm ring 250 (the inner peripheral wall portion 254) can be enhanced, and thus assembly characteristics when the main partition plate 246 is press-fitted into the inner peripheral wall portion 254 can be enhanced. In this case, particularly, the sealing performance between the protruding portion 241 and the inner peripheral wall portion 254 can be ensured, and thus the sealability between the sub-liquid chamber 209B and the orifice passage 210 can be ensured.

Figure 18:
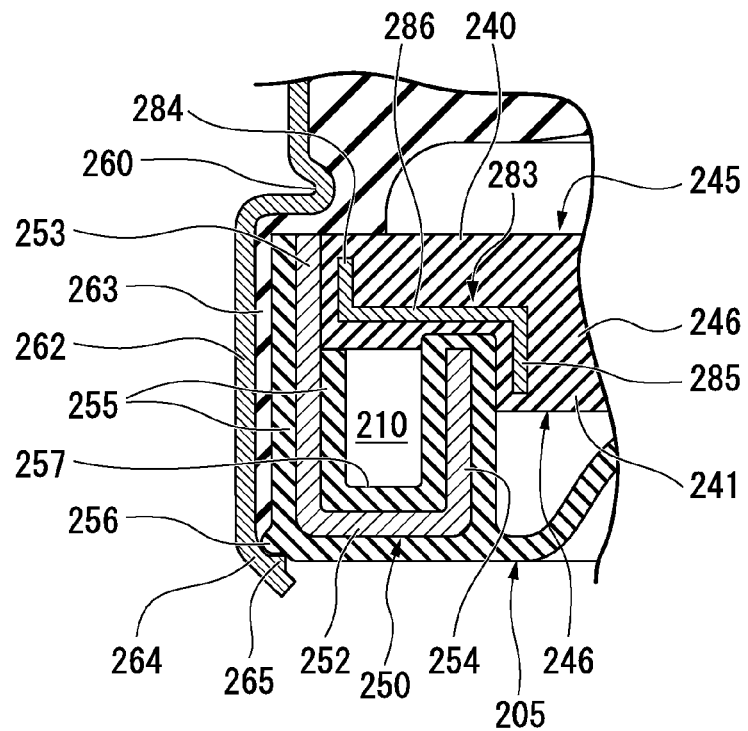
FIG. 18 is a partially enlarged cross-sectional view of an engine mount having another configuration of the third embodiment.

Moreover, as shown in FIG. 18, a reinforcement member 283 may be buried to reach the outer peripheral edge of the protruding portion 241 from the outer peripheral edge of the base portion 240. The reinforcement member 283 includes: a large diameter cylinder portion 284 disposed along the outer peripheral edge of the base portion 240; a small diameter cylinder portion 285 disposed along the outer peripheral edge of the protruding portion 241; and a connection portion 286 connecting the lower end portion of the large diameter cylinder portion 284 to the upper end portion of the small diameter cylinder portion 285. The large diameter cylinder portion 284 and the small diameter cylinder portion 285 are cylindrical members that extend in parallel to each other in the axis L direction and are formed in substantially C-shapes in the plan view. The connection portion 286 is a flat plate formed in a substantially C-shape in the plan view and is disposed to straddle the orifice passage 210 and the inner peripheral wall portion 254 in the plan view.

In this configuration, the press-fitting loads between the base portion 240 and the outer peripheral wall portion 253 and between the protruding portion 241 and the inner peripheral wall portion 254 can be enhanced, thereby further enhancing the assembly characteristics of the diaphragm ring 250 and the partition plate 245.

Fourth Embodiment

Figure 19:
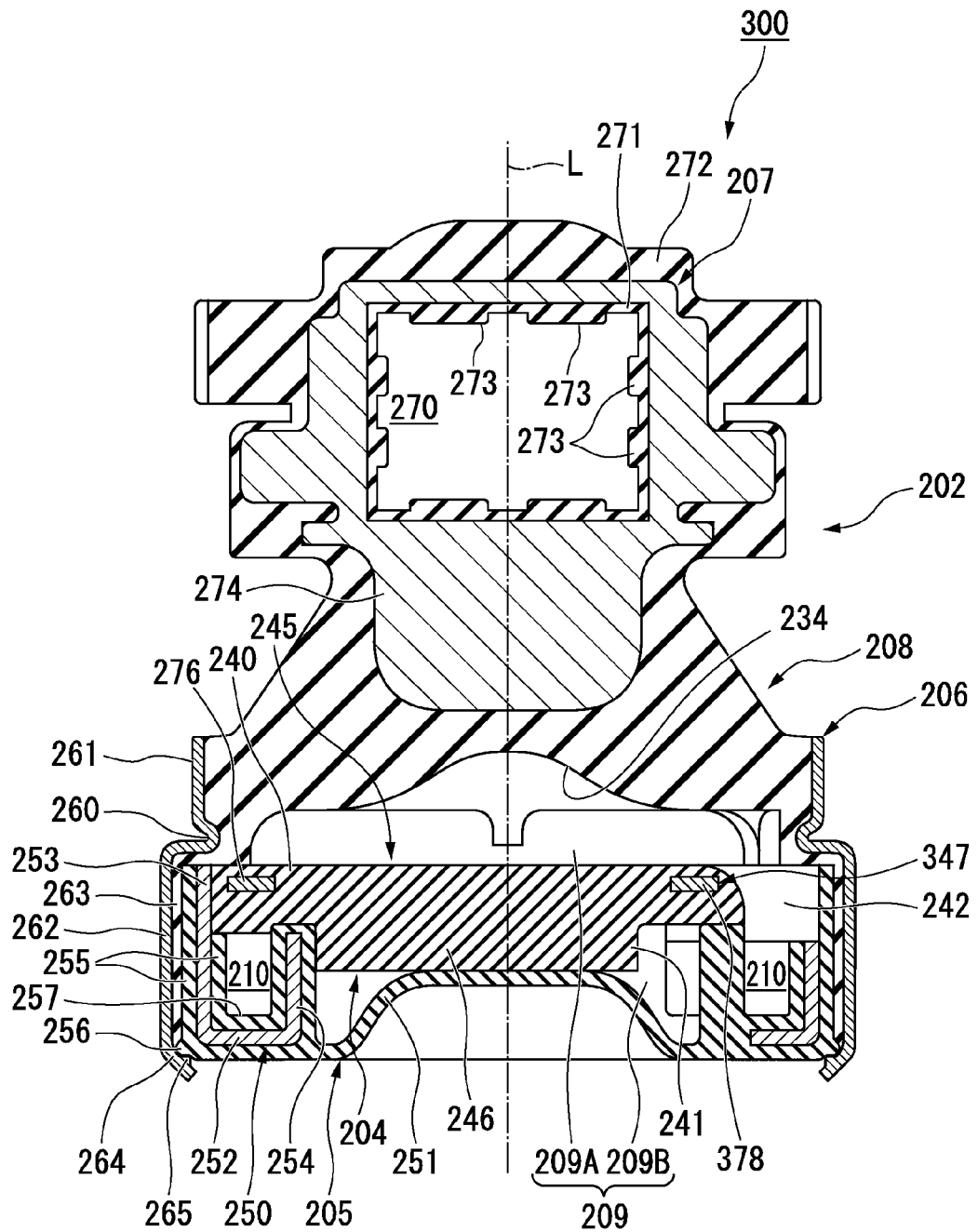
FIG. 19 is a cross-sectional view showing the entire configuration of an engine mount according to a fourth embodiment of the present invention.
Figure 20:
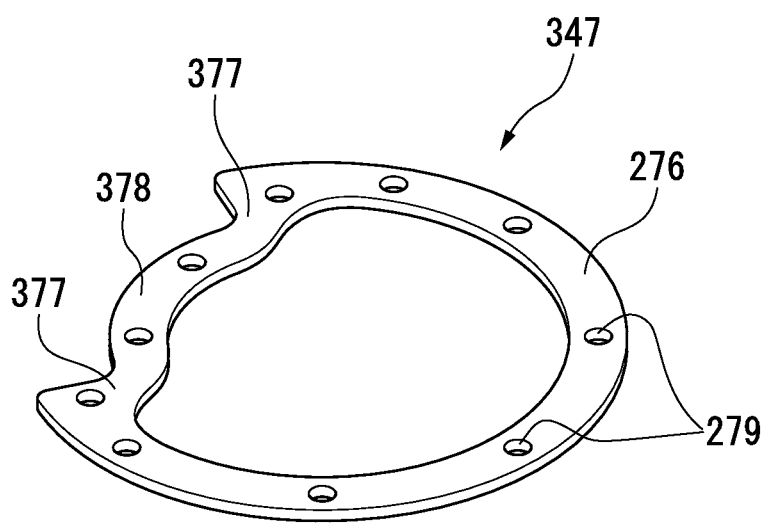
FIG. 20 is a perspective view of a reinforcement member according to the fourth embodiment.

Next, a fourth embodiment of the present invention will be described. FIG. 19 is a cross-sectional view of an engine mount in the fourth embodiment, and FIG. 20 is a perspective view of a reinforcement member. This embodiment is different from the above-described third embodiment in that an annular reinforcement member which is buried over the entire periphery in the peripheral direction of the main partition plate 246 is used. In addition, in the following description, the same elements as those in the third embodiment described above are denoted by the same reference numerals, and description thereof will be omitted.

As shown in FIGS. 19 and 20, a reinforcement member 347 of the engine mount 300 (antivibration device) in this embodiment is a member which is made of a hard body such as a metal and is buried in the base portion 240 of the main partition plate 246 on the outer peripheral side. The reinforcement member 347 includes: a first arc portion 276 disposed to overlap the orifice passage 210 in the plan view; a pair of extending portions 377 that extend inward in the radial direction from both ends in the peripheral direction of the first arc portion 276 (first reinforcement portion); a second arc portion 378 (second reinforcement portion) which bridges between the extending portions 377 and is disposed to overlap the inner peripheral wall portion 254 of the diaphragm ring 250 in the plan view (as viewed in the axial direction). That is, the reinforcement member 347 is an annular (substantially D-shaped in the plan view) member continuously formed along the outer peripheral edge of the main partition plate 246 in a state of avoiding the formation area of the main liquid chamber side orifice opening 242.

First, the first arc portion 276 has the same configuration as that of the arc portion 276 in the above-described third embodiment.

The extending portions 377 are made of hard bodies such as a metal and are formed integrally with the first arc portion 276. The tip ends of the extending portions 377 respectively extend to positions reaching the sub-liquid chamber 209B through the peripheral edge portions on both sides in the peripheral direction of the main liquid chamber side orifice opening 242 in the main partition plate 246.

The second arc portion 378 is made of a hard body such as a metal and is buried to surround the peripheral edge portion of the main liquid chamber side orifice opening 242 in the main partition plate 246. The second arc portion 378 is an arc-shaped flat plate formed at an angular range slightly wider than the formation range of the main liquid chamber side orifice opening 242 in the peripheral direction. In addition, the second arc portion 378 is disposed to overlap the inner peripheral wall portion 254 of the diaphragm ring 250 in the plan view. The inner peripheral edge of the second arc portion 378 extends to a position reaching the sub-liquid chamber 209B in the plan view, and the outer peripheral edge thereof is disposed above the inner peripheral wall portion 254 of the diaphragm ring 250. In addition, both end portions in the peripheral direction of the second arc portion 378 are respectively connected to the tip ends of the protruding portions 377 on both sides in the peripheral direction of the main liquid chamber side orifice opening 242.

As described above, as the second arc portion 378 is disposed in the peripheral edge portion on the inner side in the radial direction of the main liquid chamber side orifice opening 242 in the main partition plate 246 while the extending portions 377 are disposed in the peripheral edge portions on both sides in the peripheral direction of the main liquid chamber side orifice opening 242 in the main partition plate 246, the reinforcement member 247 is disposed to surround the peripheral edge portion of the main liquid chamber side orifice opening 242.

As shown in FIG. 31, in the engine mount 600 according to the related art, in the case where the inner cylinder (not shown) significantly moves relatively upward with respect to the outer cylinder 606 and thus vibration in the rebound direction is input to the engine mount 600, the partition plate 611 rises with respect to the diaphragm ring 650, and there is a possibility that a gap S may be formed at the abutting part of the partition plate 611 and the diaphragm ring 650. As a result, there is a possibility that the sealability between the orifice passage 610 formed between the partition plate 611 and the diaphragm ring 650 and the sub-liquid chamber 609B may not be maintained and the liquid between both the liquid chambers 609A and 609B may leak without passing through the orifice passage 610. Consequently, the liquid flowing through the orifice passage 610 directly leaks to the sub-liquid chamber 609B from the leakage part (see arrow T in FIG. 31), resulting in degradation in the vibration absorption performance of the engine mount 600.

Figure 21:
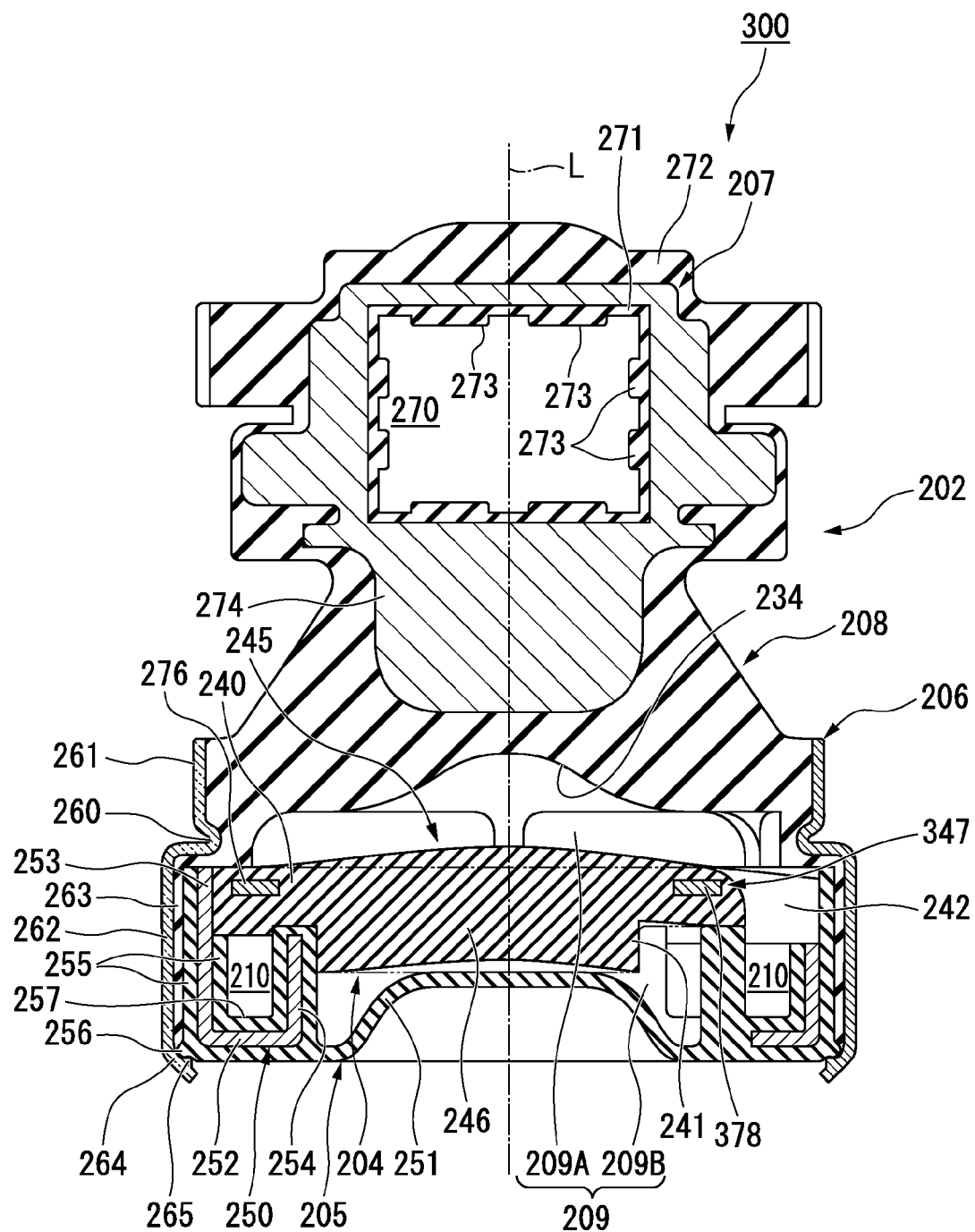
FIG. 21 is a cross-sectional view of the engine mount corresponding to FIG. 19 and is an explanatory view for explaining the operations of a partition plate.

FIG. 21 is a cross-sectional view of the engine mount corresponding to FIG. 19 and is an explanatory view for explaining the operations of the partition plate.

Here, as shown in FIG. 21, when the vibration in the rebound direction is input to the engine mount 300, the center portion in the radial direction of the partition plate 245 is curved upward. In this case, the main partition plate 246 of the partition plate 245 is entirely formed of rubber and is thus smoothly curved to follow the change in the liquid pressure of the main liquid chamber 209A. Moreover, as the reinforcement member 347 (second arc portion 378) is buried in the peripheral edge portion of the main liquid chamber side orifice opening 242 in the main partition plate 246, a part that is not interposed between the orifice passage 210 and the dent portion 260, that is, the peripheral edge portion of the main liquid chamber side orifice opening 242 can be reinforced. That is, the rigidity of the peripheral edge of the main liquid chamber side orifice opening 242 in the main partition plate 246 is increased by the second arc portion 378 and the extending portions 377, and thus bend of the peripheral edge of the main liquid chamber side orifice opening 242 can be suppressed. As a result, even in a case where high vibration is input to the engine mount 300, the partition plate 245 is prevented from rising from the surface of the upper end portion in the inner peripheral wall portion 254 of the diaphragm ring 250, and thus the sealability between the main liquid chamber side orifice opening 242 and the inner peripheral wall portion 254 of the diaphragm ring 250 can be maintained. In addition, the extending portions 377 and the second arc portion 378 in the reinforcement member 347 are disposed only in the peripheral edge portion of the main liquid chamber side orifice opening 242 and thus do not impede the elastic deformation of the main partition plate 246.

As described above, in this embodiment, the same effects as those of the third embodiment described above can be obtained.

In addition, according to this embodiment, even when high vibration is input to the engine mount 300, the partition plate 245 is prevented from rising from the surface of the upper end portion in the inner peripheral wall portion 254 of the diaphragm ring 250, and thus the sealability between the main liquid chamber side orifice opening 242 and the inner peripheral wall portion 254 of the diaphragm ring 250 can be maintained.

As a result, leakage of the liquid that is present in the orifice passage 210 into the sub-liquid chamber 209B without passing through the orifice passage 210 can be prevented, and thus the vibration absorption performance of the engine mount 300 can be enhanced. In addition, since the reinforcement member 247 is buried in the main partition plate 246, the hard member such as the reinforcement member 247 is not exposed to the main liquid chamber 209A side, and the partition wall of the main liquid chamber 209A is configured only of the rubber elastic body (the elastic body 208 or the main partition plate 246). Therefore, the impact of the breakup of bubbles during the cavitation phenomenon is reliably absorbed by the main partition plate 246, and thus the generation of noise due to the cavitation phenomenon can be suppressed and the sealability of the partition member 204 can be maintained.

Moreover, in this embodiment, the first arc portion 276 and the second arc portion 378 described above are integrally formed as the reinforcement member 347, and thus the number of components and the number of assembly processes can be reduced.

Therefore, a reduction in manufacturing cost can be achieved, and looseness of the reinforcement member 347 in the main partition plate 246 can be prevented.

Figure 22:
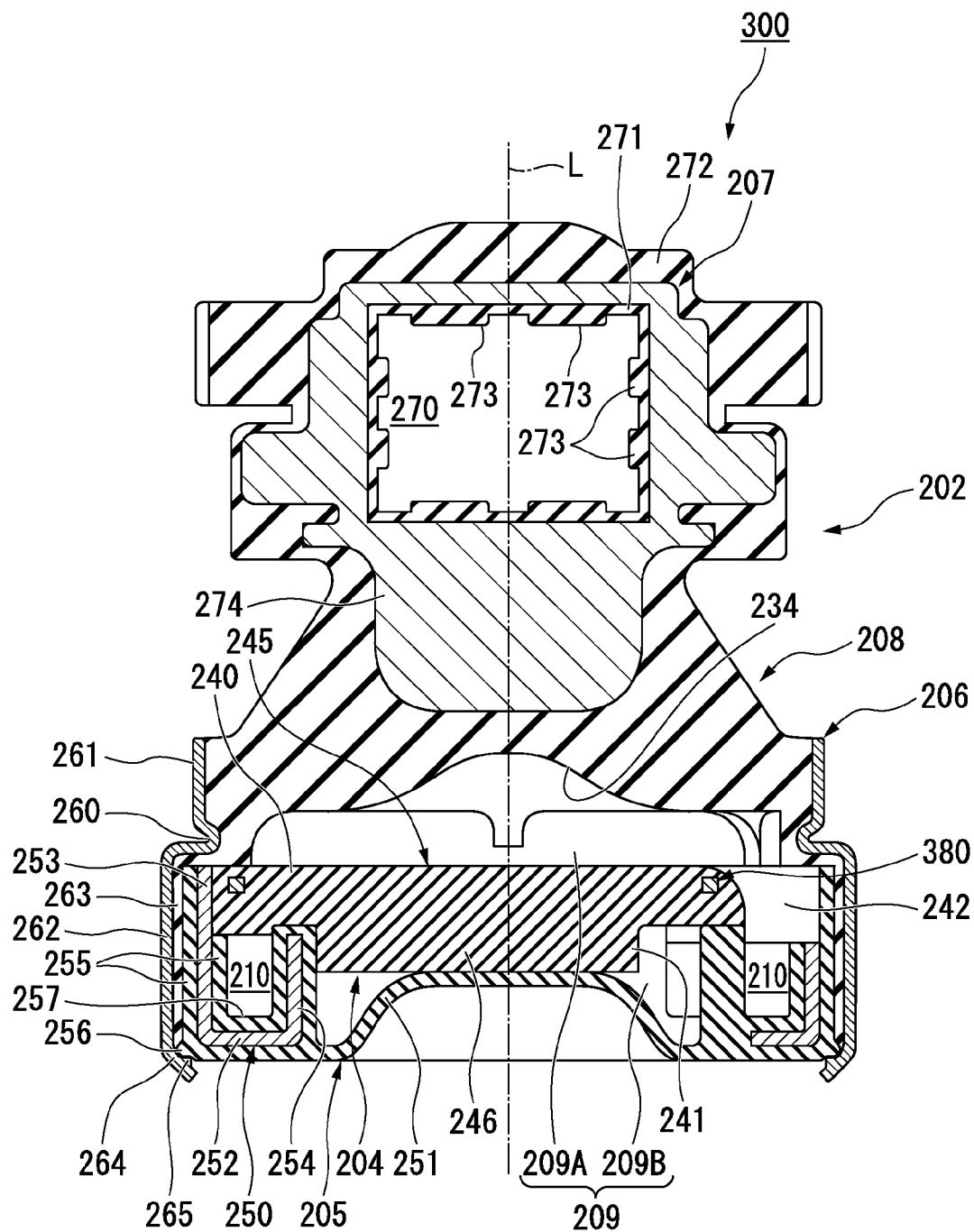
FIG. 22 is a partially enlarged cross-sectional view of an engine mount having another configuration of the fourth embodiment.
Figure 23:
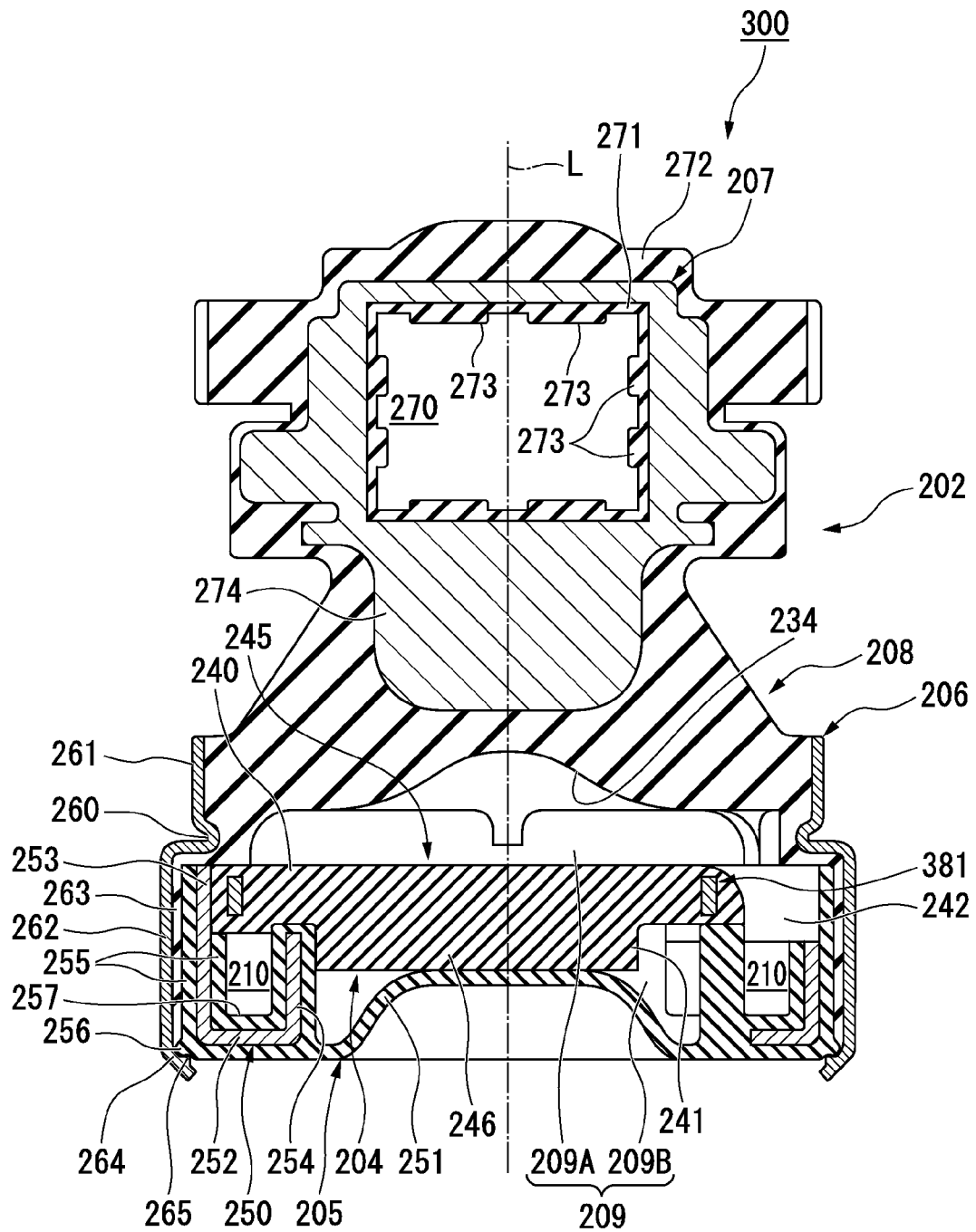
FIG. 23 is a partially enlarged cross-sectional view of an engine mount having another configuration of the fourth embodiment.

FIGS. 22 and 23 are cross-sectional views of engine mounts having other configurations of the fourth embodiment.

In addition, even in this embodiment, designing of the shapes, arrangement positions, and the like of reinforcement members may be appropriately changed. That is, as shown in FIG. 22, a configuration may also be provided in which a reinforcement member 380 having a wire material shape extends in an annular shape along the outer peripheral edge of the base portion 240 and the peripheral edge of the main liquid chamber side orifice opening 242, or as shown in FIG. 23, a configuration may also be provided in which a cylindrical reinforcement member 381 extends in an annular shape along the outer peripheral edge of the base portion 240 and the peripheral edge of the main liquid chamber side orifice opening 242. Even in this case, the same effects as those of the above-described fourth embodiment can be obtained.

Figure 24:
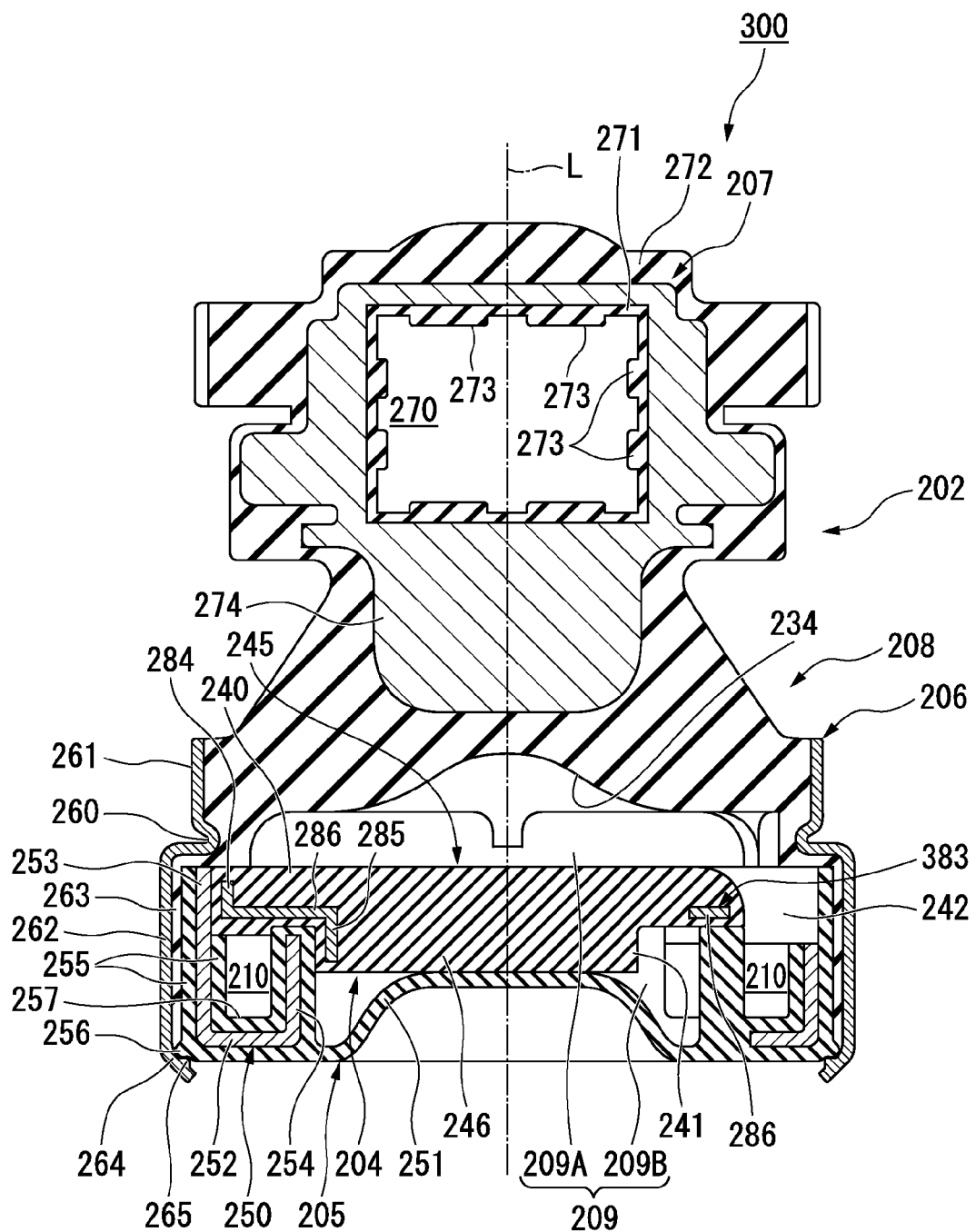
FIG. 24 is a partially enlarged cross-sectional view of an engine mount having another configuration of the fourth embodiment.

Moreover, a reinforcement member 383 shown in FIG. 24 is configured so that the above-mentioned large diameter cylinder portion 284, the small diameter cylinder portion 285, and the connection portion 286 form an annular shape. In addition, a portion of the connection portion 286, the large diameter cylinder portion 284, and the small diameter cylinder portion 285 in a region corresponding to the main liquid chamber side orifice opening 242 in the reinforcement member 383 are cut off.

That is, the reinforcement member 383 extends so that the remaining part of the connection portion 286 in the region corresponding to the main liquid chamber side orifice opening 242 surrounds the peripheral edge portion of the main liquid chamber side orifice opening 242.

In this configuration, further enhancement of the assembly characteristics of the diaphragm ring 250 and the partition plate 245 can be achieved, and the partition plate 245 can be prevented from rising from the upper end surface of the inner peripheral wall portion 254 of the diaphragm ring 250.

In addition, in the above-described embodiments, the engine (not shown), which is a vibration-generating source, is connected to the inner cylinder 207 with the engine side bracket, and the vehicle body (not shown) which is the vibration-receiving section is connected to the outer cylinder 206 with the vehicle body side bracket and the like. However, according to the present invention, the vibration-receiving section may be connected to the inner cylinder 207, and the vibration-generating source may be connected to the outer cylinder 206 with the engine side bracket and the like.

In addition, in the above-described embodiments, the antivibration device that is applied as the engine mount of a vehicle is described. However, it is possible to apply the antivibration device according to the present invention to those other than the engine mount. For example, it is possible to apply the antivibration device according to the present invention to the mount of a power generator mounted in a construction machine or to the mount of a machine installed in a factory or the like.

In addition, in the above-described embodiments, a configuration is provided in which the inner cylinder 207 extends in the direction orthogonal to the axis L and the press-fitting portion of the engine side bracket is press-fitted to the inner side of the inner cylinder 207. However, according to the present invention, the inner cylinder 207 may be arranged coaxially with the outer cylinder 206, or a configuration may also be provided in which an inner cylinder having a female threaded portion is provided and the bracket is mounted as a bolt is screwed to the female threaded portion.

In addition, in the above-described embodiments, the diaphragm 205 having the diaphragm rubber 251 in a shape in which the center part is bulged out is provided. However, according to the present invention, the diaphragm is not limited to the above-described configuration, and a configuration is possible in which a bulged part is not formed at the center part of the diaphragm rubber and the diaphragm rubber is provided inside the diaphragm ring 250 in a loose state.

In addition, in the above-described embodiments, a vacuum injection method of vacuumizing the liquid chamber 209 and injecting the liquid thereto after assembling the body rubber 202, the partition member 204, and the diaphragm 205 is employed. However, according to the present invention, it is possible to employ an in-liquid assembly method in which the liquid chamber 209 is filled with the liquid by assembling the body rubber 202, the partition member 204, and the diaphragm member 205 described above in the liquid filling the liquid chamber 209.

In this case, since the arc portion 276 is disposed inside the main partition plate 246 in the engine mount 200 described above, after the partition plate 245 and the diaphragm ring 250 are assembled, separation of the partition plate 245 and the diaphragm ring 250 is suppressed. Therefore, the transport of the components during in-liquid transport becomes easy.

In addition, in the above-described embodiments, the compression-type engine mount 200 which is mounted and installed so that the main liquid chamber 209A is positioned on the upper side in the vertical direction and the sub-liquid chamber 209B is positioned on the lower side in the vertical direction is described. However, it is possible to apply the present invention to a suspension-type engine mount which is mounted and installed so that the main liquid chamber 209A is positioned on the lower side in the vertical direction and the sub-liquid chamber 209B is positioned on the upper side in the vertical direction.

Figure 25:
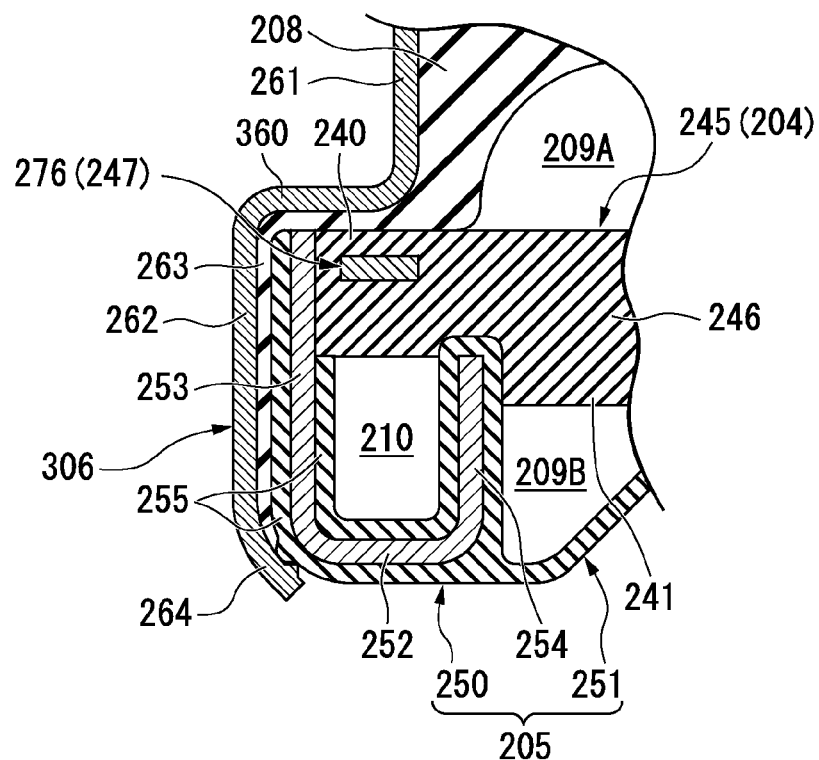
FIG. 25 is a partially enlarged cross-sectional view of an engine mount for explaining another embodiment of the present invention.
Figure 26:
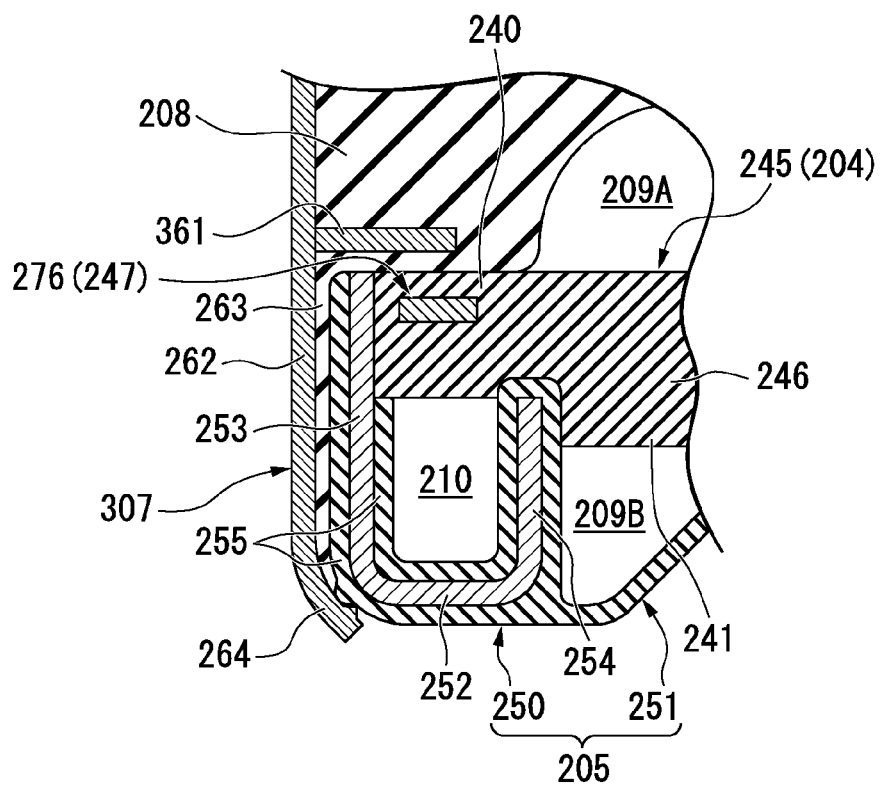
FIG. 26 is a partially enlarged cross-sectional view of an engine mount for explaining another embodiment of the present invention.

In addition, in the above-described embodiments, the dent portion 260 of which the diameter is reduced toward the inner side in the radial direction is formed in the outer cylinder 206, and the outer peripheral wall portion 253 is interposed and the partition member 204 is interposed by the dent portion 260. However, the present invention is not limited to the configuration in which the above-mentioned dent portion 260 is formed, and a locking portion or a protruding portion which has a different shape may also be formed as a locking portion for locking the upper end of the outer peripheral wall portion 253 or a protruding portion for interposing the partition plate 245. For example, as the locking portion or the protruding portion described above, as shown in FIG. 25, an outer cylinder 306 having an uneven portion 360 formed between the upper and lower cylindrical portions 261 and 262 may be provided, and as shown in FIG. 26, a flange portion 361 which protrudes from the inner peripheral surface of an outer cylinder 307 may be formed.

Figure 27:
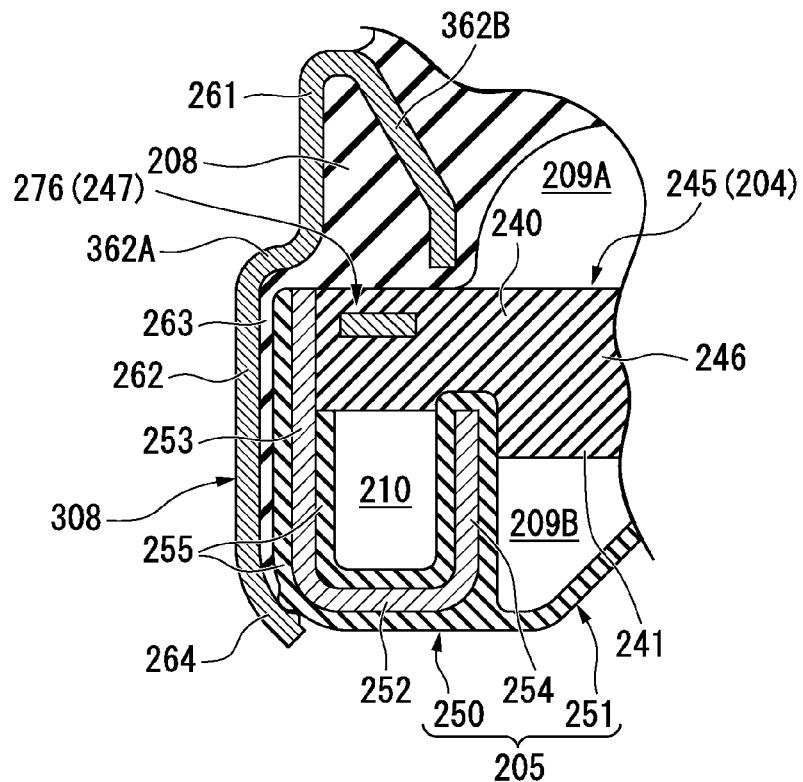
FIG. 27 is a partially enlarged cross-sectional view of an engine mount for explaining another embodiment of the present invention.

In addition, according to the present invention, the locking portion for locking the upper end of the outer peripheral wall portion 253 and the protruding portion for interposing the partition plate 245 may be separately formed. For example, as shown in FIG. 27, a configuration may also be provided in which a locking portion 362A having an uneven shape is formed at the intermediate part of an outer cylinder 308 and a protruding portion 362B having a tapered shape in which the diameter thereof is gradually reduced toward the lower side is formed at the upper end portion of the outer cylinder 308.

Figure 28:
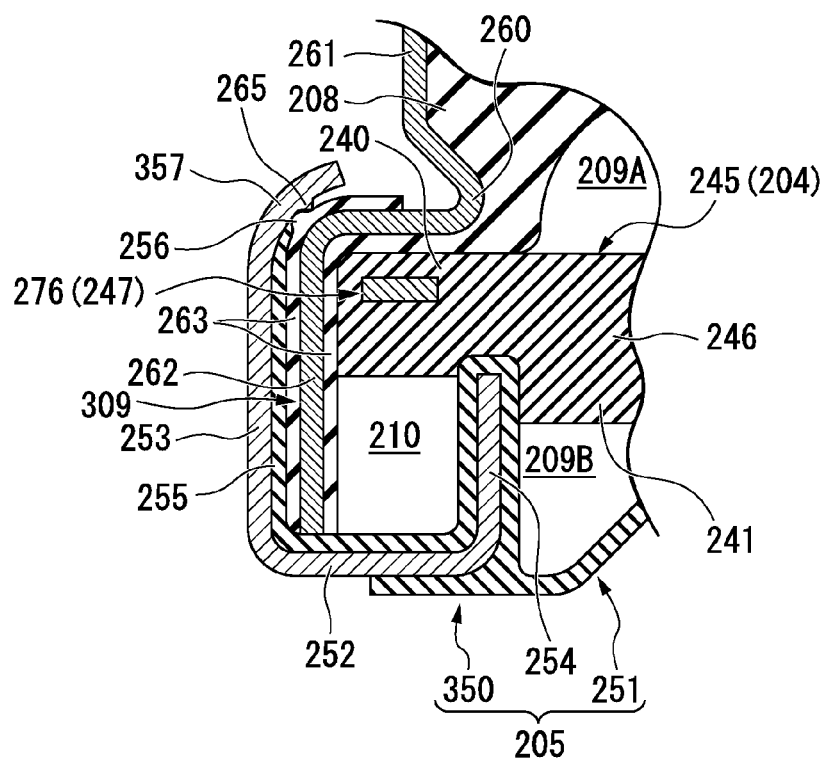
FIG. 28 is a partially enlarged cross-sectional view of an engine mount for explaining another embodiment of the present invention.

In addition, in the above-described embodiments, the outer peripheral wall portion (second cylindrical portion) 253 of the diaphragm ring 250 is disposed inside the lower cylindrical portion (first cylindrical portion) 262 of the outer cylinder 206, the dent portion 260 and the caulking portion 264 are provided in the outer cylinder 206, and the outer peripheral wall portion 253 is interposed between the dent portion 260 and the caulking portion 264. However, according to the present invention, the first cylindrical portion may be disposed inside the second cylindrical portion. For example, as shown in FIG. 28, the lower cylindrical portion 262 of an outer cylinder 309 may be fitted to the inner side of the outer peripheral wall portion 253 of a diaphragm ring 350. In this case, the bottom wall portion 252 of the diaphragm ring 350 functions as the locking portion, and the lower end of the lower cylindrical portion 262 abuts on the upper surface of the bottom wall portion 252. In addition, a caulking portion 357 is formed at the upper end portion of the outer peripheral wall portion 253, and the upper end portion of the lower cylindrical portion 262 is fixed by the caulking portion 357 for caulking. Accordingly, the lower cylindrical portion 262 is interposed between the bottom wall portion 252 and the caulking portion 357 described above. However, in this case, it is difficult to perform the narrowing process on the outer peripheral wall portion 253 as in the above-described embodiments, and thus sealability may not be easily enhanced. Therefore, it is preferable that the outer peripheral wall portion 253 is disposed inside the lower cylindrical portion 262 as in the above-described embodiments.

Figure 29:
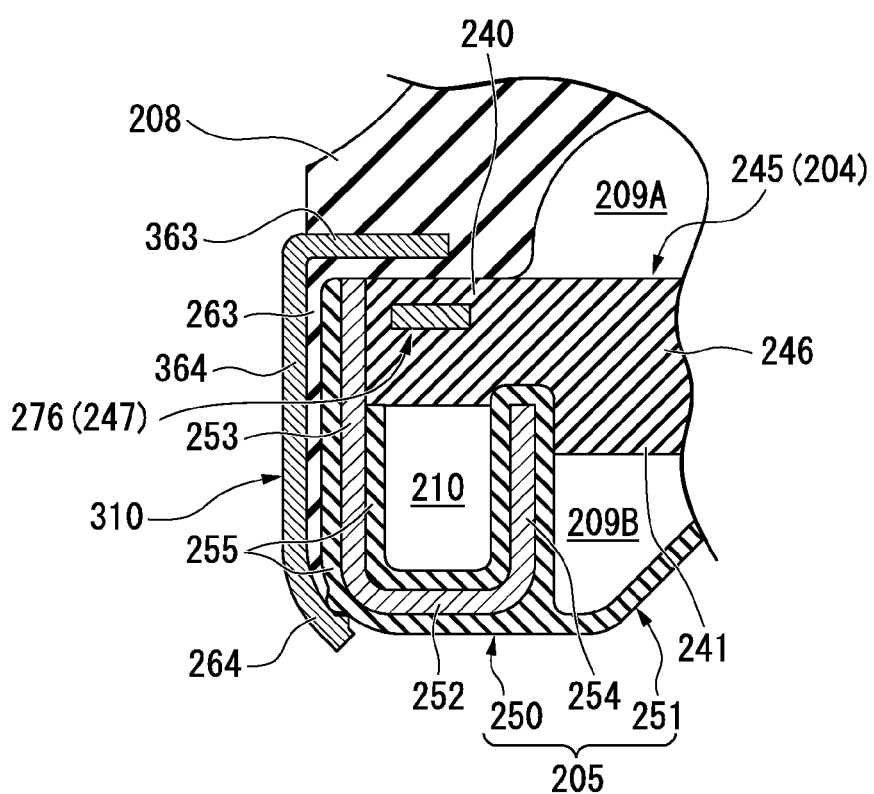
FIG. 29 is a partially enlarged cross-sectional view of an engine mount for explaining another embodiment of the present invention.

In addition, in the above-described embodiments, a configuration is provided in which the outer cylinder 206 is provided with the dent portion 260 between the upper and lower cylindrical portions 261 and 262. However, according to the present invention, it is possible to omit the upper cylindrical portion 261. For example, as shown in FIG. 29, a configuration may also be provided in which a flange portion 363 (protruding portion, locking portion) which protrudes inward in the radial direction is provided at the upper end of an outer cylinder 310 (first cylindrical portion 364) and the caulking portion 264 is provided at the lower end of the outer cylinder 310 (first cylindrical portion 364). Accordingly, the length in the axis L direction of the engine mount 200 is reduced, thereby achieving a reduction in size. The first cylindrical portion 364 is narrowed toward the inner side in the radial direction and is press-fitted to the inner side of a bracket (not shown).

In addition, in the above-described embodiments, the diaphragm rubber 251 and the diaphragm ring 250 are integrally formed. However, according to the present invention, it is possible to provide the diaphragm ring 250 separately from the diaphragm rubber 251.

In addition, in the above-described embodiments, the opening end of the diaphragm ring 250 having the U-shape in the cross-sectional view is blocked by the partition plate 245 and the orifice passage 210 is formed by the partition plate 245, the bottom wall portion 252, the outer peripheral wall portion 253, and the inner peripheral wall portion 254. However, the present invention is not limited to the diaphragm ring 250 having the above-described shape, and a diaphragm ring 250 having a different shape may also be employed.

In addition, in the above-described embodiments, a configuration is provided in which the coating rubber 263 is formed on the inner peripheral surface of the lower cylindrical portion 262, the coating rubber 255 is formed on the outer peripheral surface of the outer peripheral wall portion 253, and the coating rubbers 255 and 263 are interposed between the lower cylindrical portion 262 and the outer peripheral wall portion 253. However, a configuration may also be employed in which a coating rubber is formed on only one of the lower cylindrical portion 262 and the outer peripheral wall portion 253, or a configuration is possible in which no rubber layer is interposed between the lower cylindrical portion 262 and the outer peripheral wall portion 253.

In addition, it is not preferable to expose the reinforcement member 247 to the inside of the liquid chamber 209 or the orifice passage 210. However, there is no problem with exposing the outer peripheral edge of the reinforcement member 247 to the inner peripheral surface of the outer peripheral wall portion 253 of the diaphragm ring 250. In this case, when the partition plate 245 is press-fitted to the inner side of the outer peripheral wall portion 253, metals come into contact with each other during press-fitting, and thus the press-fitting load of the partition plate 245 is increased. Therefore, the diaphragm ring 250 and the partition plate 245 can be reliably assembled.

INDUSTRIAL APPLICABILITY

According to the present invention, an antivibration device capable of enhancing the assembly characteristics of a partition plate, ensuring sealability between a partition member and each liquid chamber, and obtaining stable vibration absorption performance.

REFERENCE SIGNS LIST 1, 100, 200, 300: engine mount (antivibration device)
4, 204: partition member
6, 106, 107, 108, 109, 110, 206, 306, 307, 308, 309, 310: outer cylinder (first mounting member)
7, 207: inner cylinder (second mounting member)
8, 208: elastic body
9, 209: liquid chamber
9A, 209A: main liquid chamber
9B, 209B: sub-liquid chamber
10, 210: orifice passage (restriction passage)
42, 242: main liquid chamber side orifice opening (communication portion)
45, 245: partition plate
46, 246: main partition plate
47, 147, 247, 280, 281, 282, 283, 347, 380, 381, 383: reinforcement member
50, 150, 250, 350: diaphragm ring (hard member)
52, 252: bottom wall portion
53, 253: outer peripheral wall portion (second cylindrical portion)
54, 254: inner peripheral wall portion (support portion)
55, 255: coating rubber (rubber layer)
60, 260: dent portion (protruding portion, locking portion)
62, 262: lower cylindrical portion (first cylindrical portion)
63, 263: coating rubber (rubber layer)
64, 157, 264, 357: caulking portion
76, 276: first arc portion (arc portion, reinforcement member)
78, 377: extending portion (reinforcement member)
177, 378: second arc portion (reinforcement member)
160: uneven portion (protruding portion, locking portion)
161, 163: flange portion (protruding portion, locking portion)
162A: locking portion
162B: protruding portion
164: first cylindrical portion

The invention claimed is:
1. A liquid-sealed type antivibration device comprising:
a cylindrical first mounting member connected to one of a vibration-generating section and a vibration-receiving section;
a second mounting member connected to the other of the vibration-generating section and the vibration-receiving section;
an elastic body which elastically connects the first mounting member to the second mounting member and blocks an opening end of one side of the first mounting member;
a diaphragm which blocks an opening end of the other side of the first mounting member; and
a partition member, which divides a liquid chamber that is formed between the elastic body and the diaphragm and has a liquid sealed therein, into a main liquid chamber that uses the elastic body as a portion of a wall surface thereof and a sub-liquid chamber that uses the diaphragm as a portion of a wall surface thereof, and in which a restriction passage that causes the main liquid chamber and the sub-liquid chamber to communicate is formed, wherein
the first mounting member includes a protruding portion that protrudes inward in a radial direction, and a first cylindrical portion disposed further to the sub-liquid chamber side than the protruding portion,
the partition member includes a partition plate that divides the liquid chamber into the main liquid chamber and the sub-liquid chamber, and an annular hard member made of a hard body that is harder than the elastic body,
the hard member includes a second cylindrical portion disposed coaxially with the first cylindrical portion, and a support portion that is disposed inside the second cylindrical portion and supports the partition plate,
one of the first and second cylindrical portions is disposed inside the other of the first and second cylindrical portions,
one of the first mounting member and the hard member, which includes a cylindrical portion of the first and second cylindrical portions that is disposed on an outer side thereof, is provided with a locking portion that locks one end portion of a cylindrical portion of the first and second cylindrical portions that is disposed on an inner side thereof, and a caulking portion that is bent inward in the radial direction and locks the other end portion of the cylindrical portion of the first and second cylindrical portions that is disposed on the inner side thereof,
the cylindrical portion of the first and second cylindrical portions that is disposed on the inner side thereof is interposed between the locking portion and the caulking portion,
the partition plate includes a main partition plate made of an elastic material interposed between the protruding portion and the support portion, and a reinforcement member that is buried in the main partition plate and is made of a hard body that is harder than the main partition plate, the main partition plate is disposed inside the cylindrical portion of the first and second cylindrical portions that is disposed on the inner side thereof, the hard member is formed in a U-shape in a cross-sectional view by an annular bottom wall portion, the second cylindrical portion having an outer peripheral wall shape connected to an outer edge portion of the bottom wall portion, and the support portion having an inner peripheral wall shape connected to an inner edge portion of the bottom wall portion, the partition plate blocks an opening end of the hard member having the U-shape in a cross-sectional view, a space surrounded by the partition plate, the bottom wall portion, the second cylindrical portion, and the support portion constitutes the restriction passage that causes the main liquid chamber and the sub-liquid chamber to communicate, the main partition plate is provided with a communication portion that penetrates therethrough in an axial direction and causes the main liquid chamber and the restriction passage to communicate, the reinforcement member is arranged in an annular shape inside the cylindrical portion of the first and second cylindrical portions that is disposed on the inner side thereof, and the reinforcement member includes a first reinforcement portion disposed along a peripheral edge portion of the main partition plate, and a second reinforcement portion that is formed to bridge both end portions of the first reinforcement portion and is disposed to surround a peripheral edge of the communication portion.

2. The antivibration device according to claim 1, wherein
the second cylindrical portion is disposed inside the first cylindrical portion,
the locking portion and the caulking portion are formed in the first mounting member, and
the second cylindrical portion is interposed between the locking portion and the caulking portion.

3. The antivibration device according to claim 1, wherein
a thin film-shaped diaphragm rubber which is deformable through a change in liquid pressure of the sub-liquid chamber is disposed inside the hard member in the radial direction, and
the hard member constitutes a diaphragm ring of the diaphragm.

4. The antivibration device according to claim 1, wherein
a rubber layer is provided between the first and second cylindrical portions.

* * * * *